US 8,374,618 B2

(12) United States Patent
Pernu et al.

(10) Patent No.: US 8,374,618 B2
(45) Date of Patent: *Feb. 12, 2013

(54) MANAGING UNSCHEDULED WIRELESS COMMUNICATION IN A MULTIRADIO DEVICE

(75) Inventors: Ville Pernu, Tampere (FI); Antti Piipponen, Tampere (FI); Päivi M. Ruuska, Tampere (FI)

(73) Assignee: Nokia Corporation, Espoo (FI)

( * ) Notice: Subject to any disclaimer, the term of this patent is extended or adjusted under 35 U.S.C. 154(b) by 574 days.

This patent is subject to a terminal disclaimer.

(21) Appl. No.: 12/634,178

(22) Filed: Dec. 9, 2009

(65) Prior Publication Data

US 2010/0085951 A1   Apr. 8, 2010

Related U.S. Application Data

(62) Division of application No. 11/673,231, filed on Feb. 9, 2007, now Pat. No. 7,653,397.

(51) Int. Cl.
*H04Q 7/00* (2006.01)

(52) U.S. Cl. ........................ 455/450; 455/550.1; 370/338

(58) Field of Classification Search .................. 455/418, 455/450, 550.1; 370/328, 338
See application file for complete search history.

(56) References Cited

U.S. PATENT DOCUMENTS

| 5,748,620 | A | * | 5/1998 | Capurka | 370/328 |
| 5,805,598 | A | | 9/1998 | Loney | |
| 6,119,002 | A | * | 9/2000 | Alanara | 455/434 |
| 6,515,577 | B1 | * | 2/2003 | Ong et al. | 340/7.43 |
| 6,597,906 | B1 | | 7/2003 | Van Leeuwen et al. | |
| 6,771,626 | B1 | | 8/2004 | Golubiewski et al. | |
| 6,944,440 | B1 | | 9/2005 | Kim | |
| 7,079,812 | B2 | * | 7/2006 | Miller et al. | 455/63.1 |
| 7,653,397 | B2 | * | 1/2010 | Pernu et al. | 455/450 |
| 2003/0235202 | A1 | | 12/2003 | Van Der Zee et al. | |

(Continued)

FOREIGN PATENT DOCUMENTS

| EP | 1119137 | 7/2001 |
| EP | 1389855 | 2/2004 |

(Continued)

OTHER PUBLICATIONS

"Wi-Fi and Bluetooth: An Examination of Coexistence Approaches" Internet Citation, [Online] 2001, XP002285787 Retrieved from the Internet: URL:http://www.tkn.tu-berlin.de/curricula/literature/kts/1_Coexistence_of_802.11b_and_Bluetooth1.pdf>[retrieved on Jun. 23, 2004] the whole document.

(Continued)

*Primary Examiner* — Nhan Le
(74) *Attorney, Agent, or Firm* — Locke Lord LLP

(57) ABSTRACT

A system for managing the operation of a plurality of radio modules integrated within the same wireless communication device. A control strategy may be employed to manage both more predictable and more spontaneous wireless communication mediums, wherein a local controller may be employed in a radio module utilizing an unscheduled wireless medium, like WLAN, for determining whether adequate time has been allocated to complete a transaction. If the transaction cannot be completed in the allowed time, it may be delayed until adequate time exists, and the delay may be reported so that the time may be reallocated to other radio modules. The radio module may then enter a power-saving mode until the transaction can be completed.

11 Claims, 27 Drawing Sheets

U.S. PATENT DOCUMENTS

2005/0020299 A1  1/2005 Malone et al.
2006/0002428 A1  1/2006 Trainin
2007/0058605 A1  3/2007 Meylan et al.

FOREIGN PATENT DOCUMENTS

EP  2119139 B1  2/2012

OTHER PUBLICATIONS

IEEE Computer Society: "IEEE 802.15.2: Part 15.2—Coexistence of Wireless Personal Area Networks with Other Wireless Devices Operating in Unlicensed Frequency Bands" Internet Citation, [Online] Aug. 28, 2003, XP002419622, Retrieved from the Internet: URL:http://standards.ieee.org/reading/ieee/std/lanman/restricted/802.15.2 2003.pdf> [retrieved on Feb. 12, 2007] the whole document.

Shellhammer S: "IEEE 802.15.2 Clause 14.1—Collaborative Coexistence Mechanism" Project: IEEE P802.15 Working Group for Wireless Personal Area Networks (WPANS), Jul. 9, 2001, pp. 1-4, XP002289478 the whole document.

Chiasserini C F et al.: "Coexistence Mechanisms for Interference Mitigation Between IEEE 802.11 WLANs and Bluetooth", Proceedings IEEE INFOCOM 2002. The Conference on Computer Communications. 21st. Annual Joint Conference of the IEEE Computer and Communications Societies. New York, NY, Jun. 23-27, 2002, Proceedings IEEE INFOCOM. The Conference on Computer Communica, vol. 1 of 3, Conf. 21, Jun. 23, 2002, pp. 590-598, XP010593620 ISBN: 0-7803-7476-2.

English Translation of Substantive Examination Report Stage II for Indonesian Application No. W-00200902483, 1pp.

English Translation of Substantive Examination Report Stage I for Indonesian Application No. W-00200902483, 2pp.

* cited by examiner

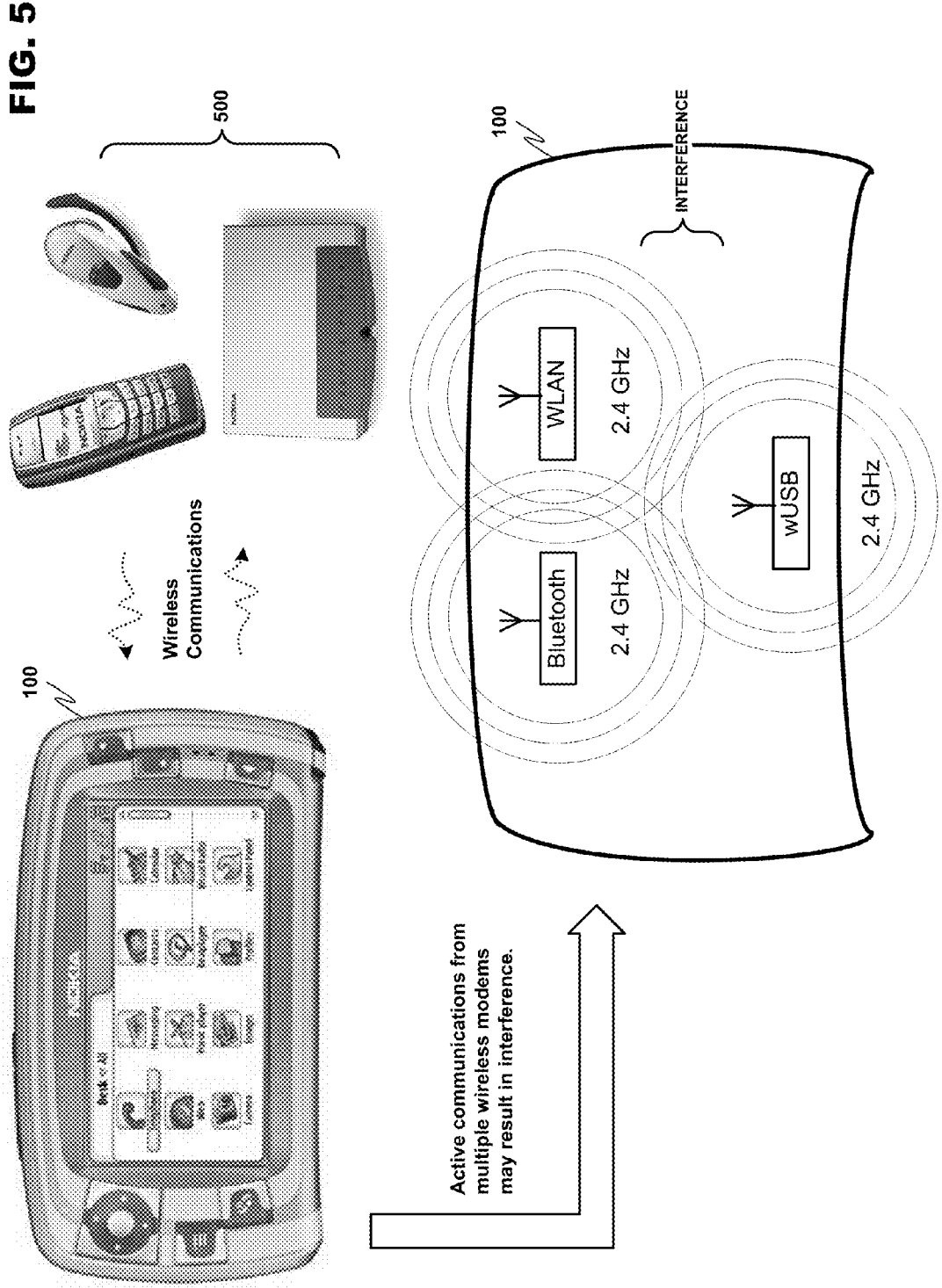

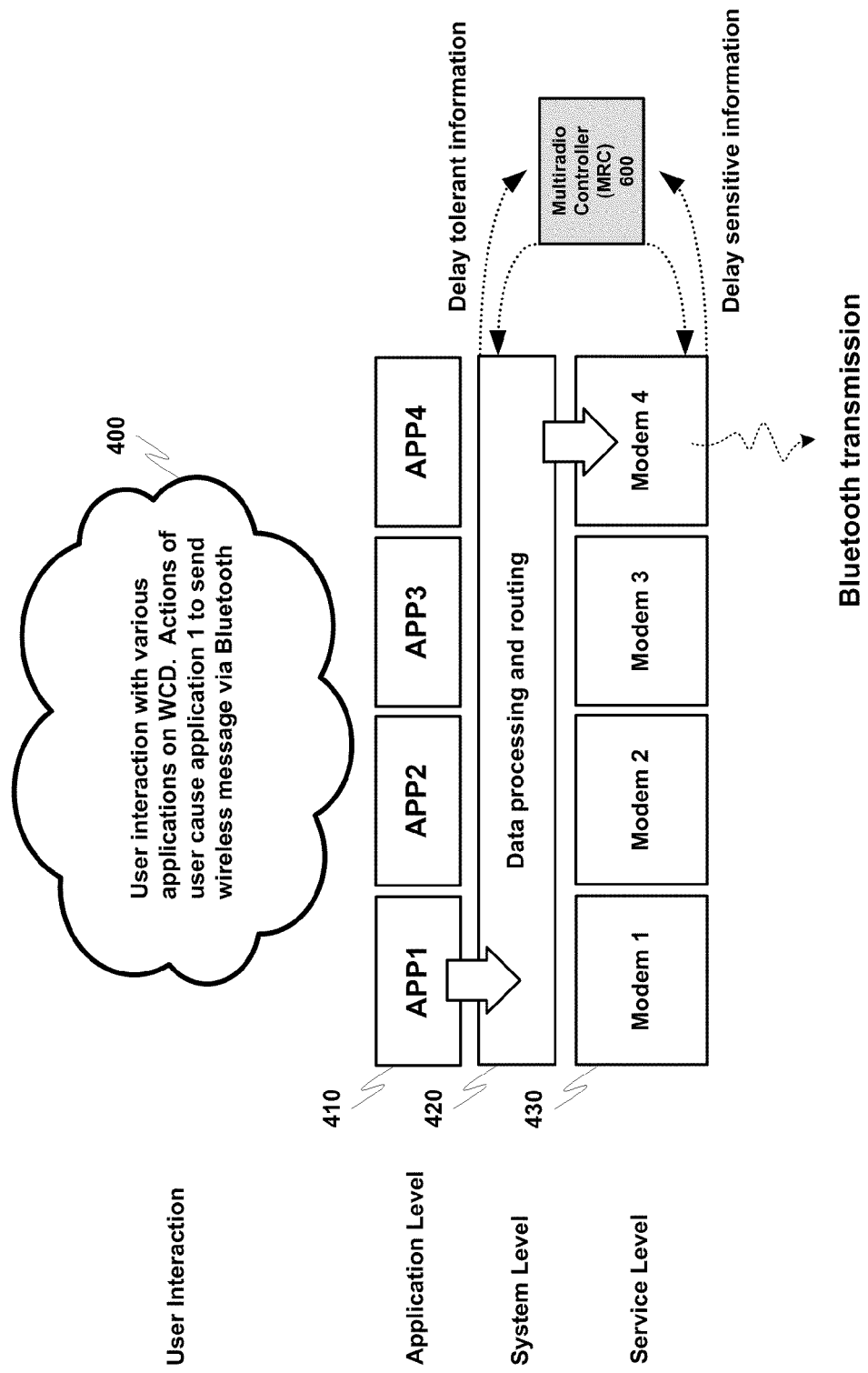

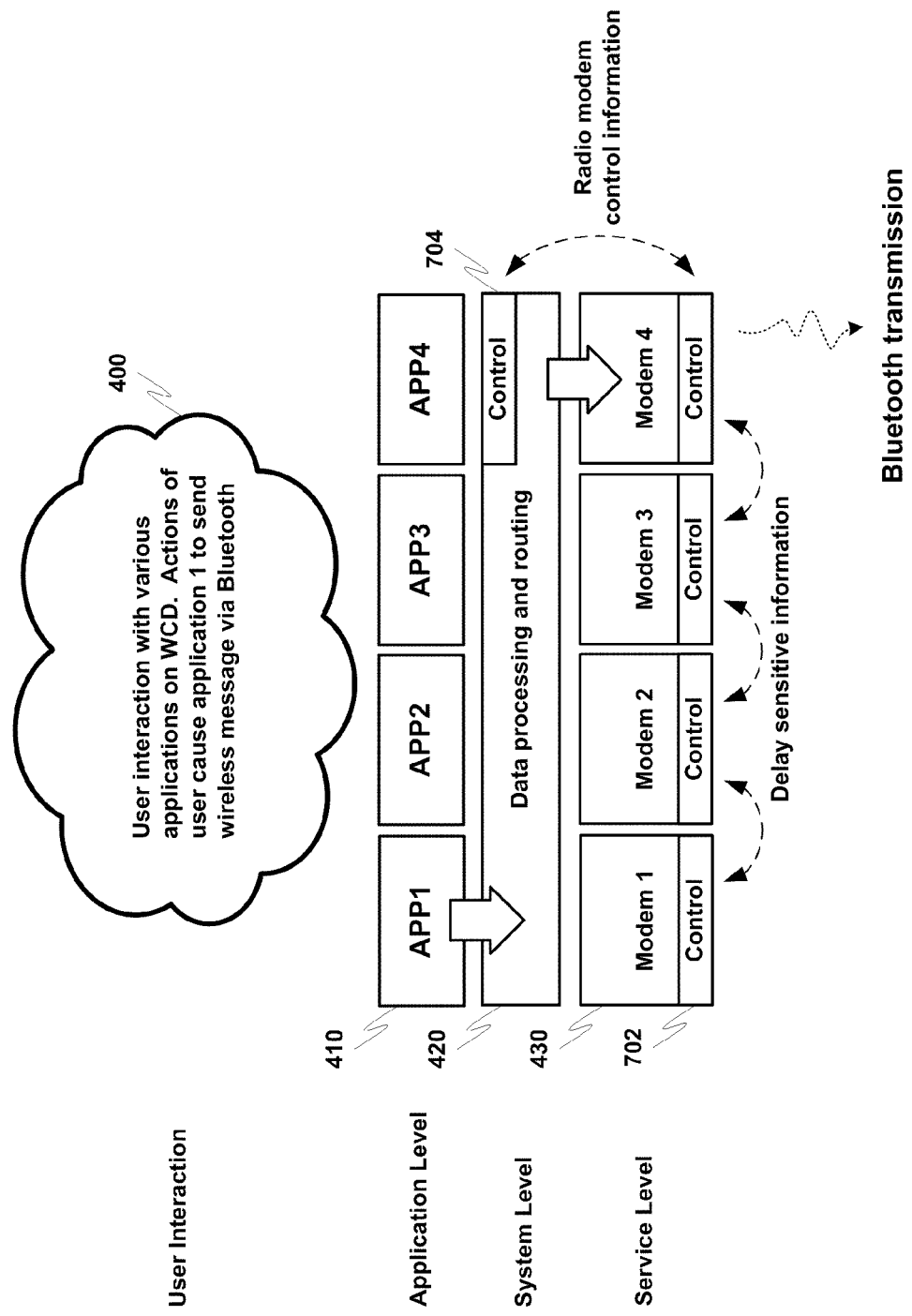

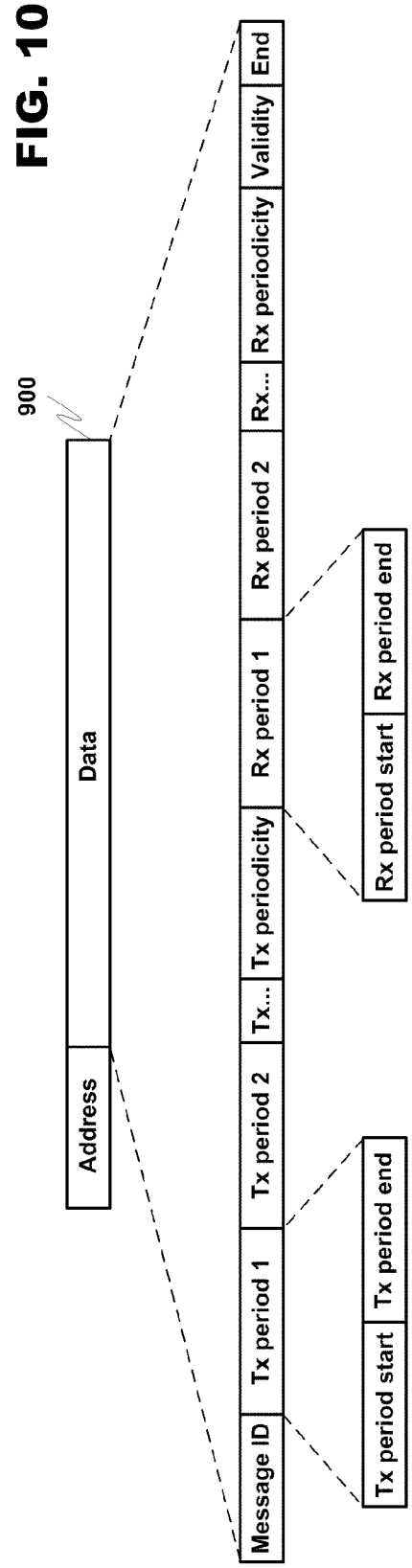

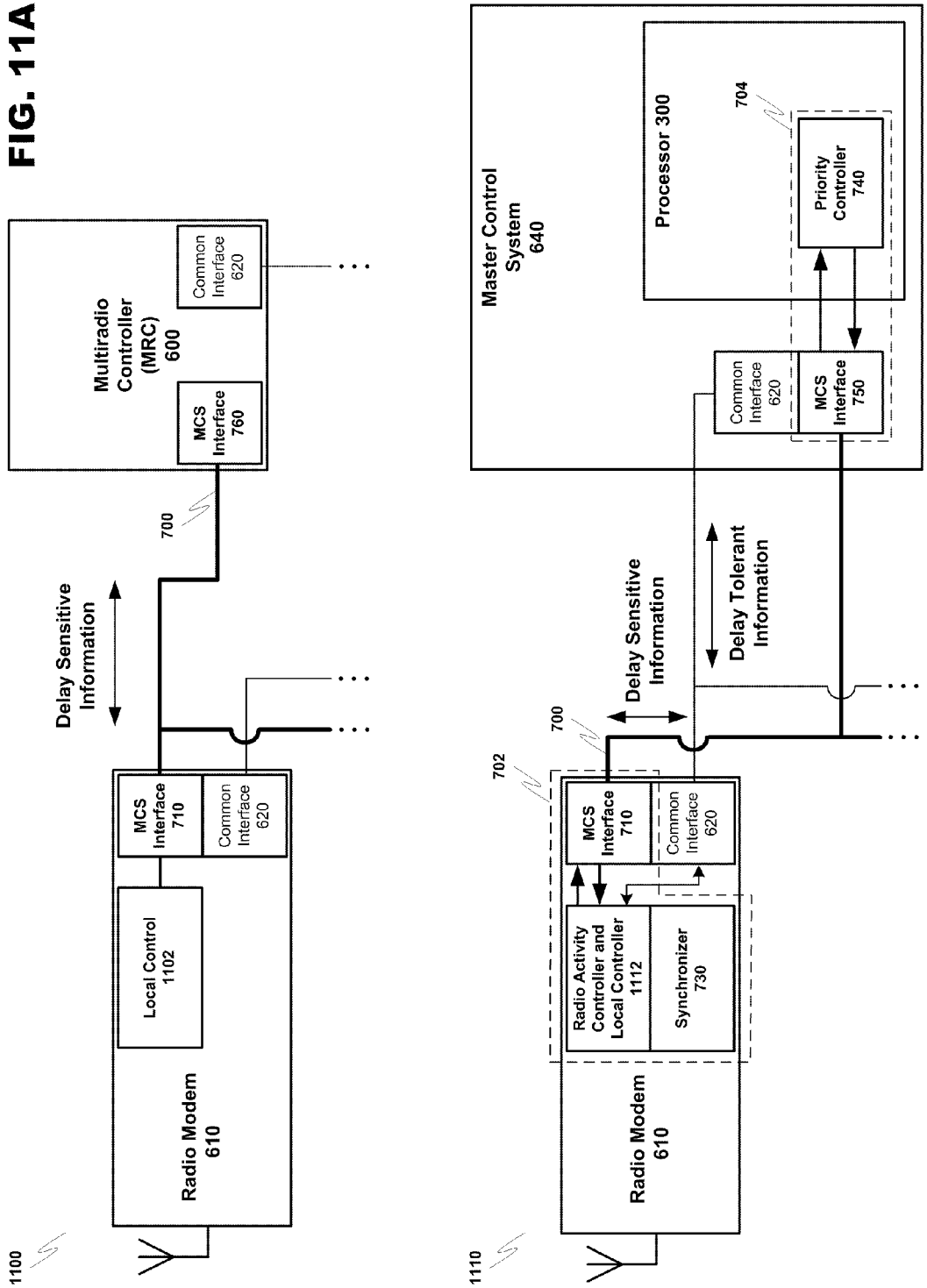

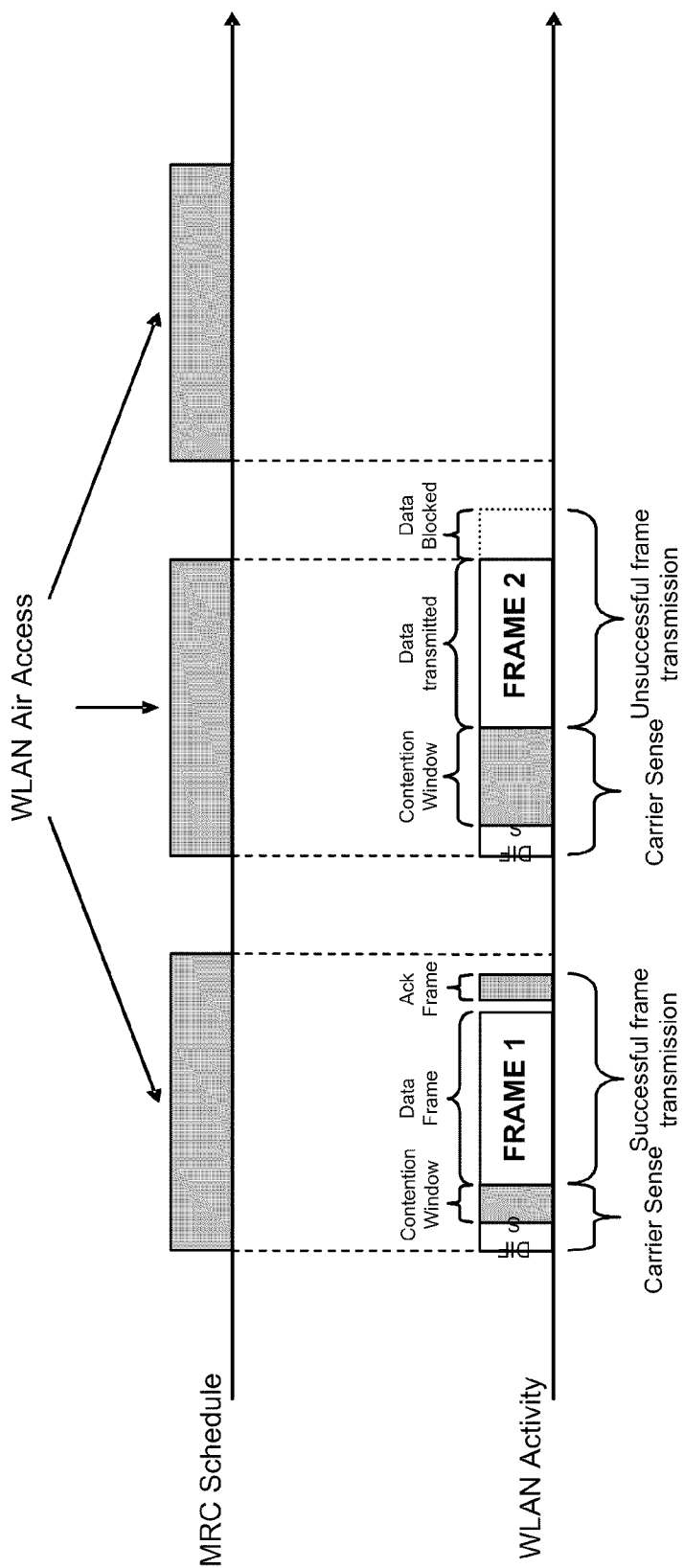

MANAGING UNSCHEDULED WIRELESS COMMUNICATION IN A MULTIRADIO DEVICE

This is a Divisional Application of prior co-pending U.S. application Ser. No. 11/673,231, filed Feb. 9, 2007, of which the entire disclosure is incorporated herein by reference.

BACKGROUND OF INVENTION

1. Field of Invention

The present invention relates to a system for managing multiple radio modems integrated within a wireless communication device, and more specifically, to a multiradio control system enabled to create an operational schedule for a plurality of radio modems, wherein a radio modem having local control may manage unscheduled communication in view of various inputs.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near Field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers continue to incorporate as many of the previously discussed exemplary communication features as possible into wireless communication devices in an attempt to bring powerful, "do-all" devices to market. Devices incorporating long-range, short-range and NFC resources often include multiple mediums for each category. This may allow a WCD to flexibly adjust to its surroundings, for example, communicating both with a WLAN access point and a Bluetooth™ communication accessory, possibly at the same time.

Given the large array communication features that may be compiled into a single device, it is foreseeable that a user will need to employ a WCD to its full potential when replacing other productivity related devices. For example, a user may utilize a fully-functioned WCD to replace traditional tools such as individual phones, facsimile machines, computers, storage media, etc. which tend to be cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

Evolving strategies for regulating air time between two or more radio modems contained in the same device often require a centralized (as a single component or distributed among various components) communication control enforcing an operational schedule for all active radio modems, the regulation of which helps to reduce the possibility of communication collisions between these active radio modems. However, in order for the operational schedule to be effective, the interplay of modem activity must be precisely controlled. This precision may be derived from the communication controller being synchronized with the modem by, for example, knowing the communication backlog and the timing patterns of the various active radio modems.

While centrally-controlled wireless resource management may be especially effective in optimizing some wireless mediums, other wireless mediums may continue to be problematic. For example, wireless protocols that are enabled for carrying synchronous data or may operate in a mode that uses fixed transmission and reception intervals, like GSM and Bluetooth™, may be more readily managed by a centralized controller because a schedule may be precisely defined without requiring large buffer time periods. However, other wireless mediums are not so predictive, such as WLAN. These unscheduled wireless mediums must compete for available transactional windows, and as a result, may require larger time periods to allow for determination of carrier availability. These determination periods, or contention periods, may require more time to complete a transaction, including both a message frame to be sent and also an acknowledgement frame to be received. If both of these frames are not sent/received in the time available, the message is considered unsuccessful, which may waste time in two ways: time is wasted in the initial failed WLAN message attempt (this time could have been successfully used by another wireless medium), and further, time is wasted in attempting to transmit the WLAN message again, which may still fail.

What is therefore needed is a system for managing wireless resources in the same device that utilize conflicting wireless communication mediums. The system should be enabled to manage both more predictable wireless communication mediums and wireless communication mediums that utilize unscheduled communication in order to avoid communication problems.

SUMMARY OF INVENTION

The present invention includes at least a method, device, computer program and radio module for managing the operation of a plurality of radio modules integrated within the same WCD. In at least one embodiment of the present invention, a control strategy may be employed to manage both more predictable and more spontaneous wireless mediums. A local controller may be employed in a radio module utilizing an unscheduled wireless medium, like WLAN, for determining whether adequate time is allowed for completing a transaction. If the transaction cannot be completed in the time period, it may be delayed until adequate time exists.

The local controller, in at least one embodiment of the present invention, may consider information provided from various resources in the WCD before making a determination as to whether there is adequate time for a transaction. For example, a multiradio controller (MRC) may provide schedule information including at least time periods reserved for a particular communication medium or radio module. The local controller may compare the schedule information to information concerning messages waiting for transmission while also performing carrier sensing to determine whether a communication channel is available for use. If the MRC allows communication, the channel is free, there is enough time, and any contention periods have expired, the controller may initiate a transaction on the communication channel.

If all of the above conditions are not satisfied, the local controller may perform alternative actions in an attempt to maximize efficiency in the WCD. For example, the local controller may continue to delay any communication transactions until a suitable time period is determined. In conjunction with this delay, the local controller may further initiate optimization procedures such as informing the MRC of available communication bandwidth that may be assigned to another radio module, as well as placing the delayed radio module in a power saving mode. These actions are examples of measures that may be put in place to both optimize the usage of available bandwidth while conserving power in accordance with the present invention.

DESCRIPTION OF DRAWINGS

The invention will be further understood from the following detailed description of a preferred embodiment, taken in conjunction with appended drawings, in which:

FIG. 5 discloses an operational example wherein interference occurs when utilizing multiple radio modems simultaneously within the same wireless communication device.

FIG. 7C discloses an exemplary operational description of a wireless communication device including a multiradio control system in accordance with at least one embodiment of the present invention.

FIG. 9C discloses an exemplary operational description of a wireless communication device including a distributed multiradio control system in accordance with the alternative embodiment of the present invention disclosed in FIG. 9A.

FIG. 10 discloses an exemplary information packet usable with at least one embodiment of the present invention.

FIG. 11A discloses an example of a local controller incorporated into a radio modem in accordance with at least one embodiment of the present invention.

FIG. 12A discloses an example of an unscheduled wireless communication medium transmission experiencing problems in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
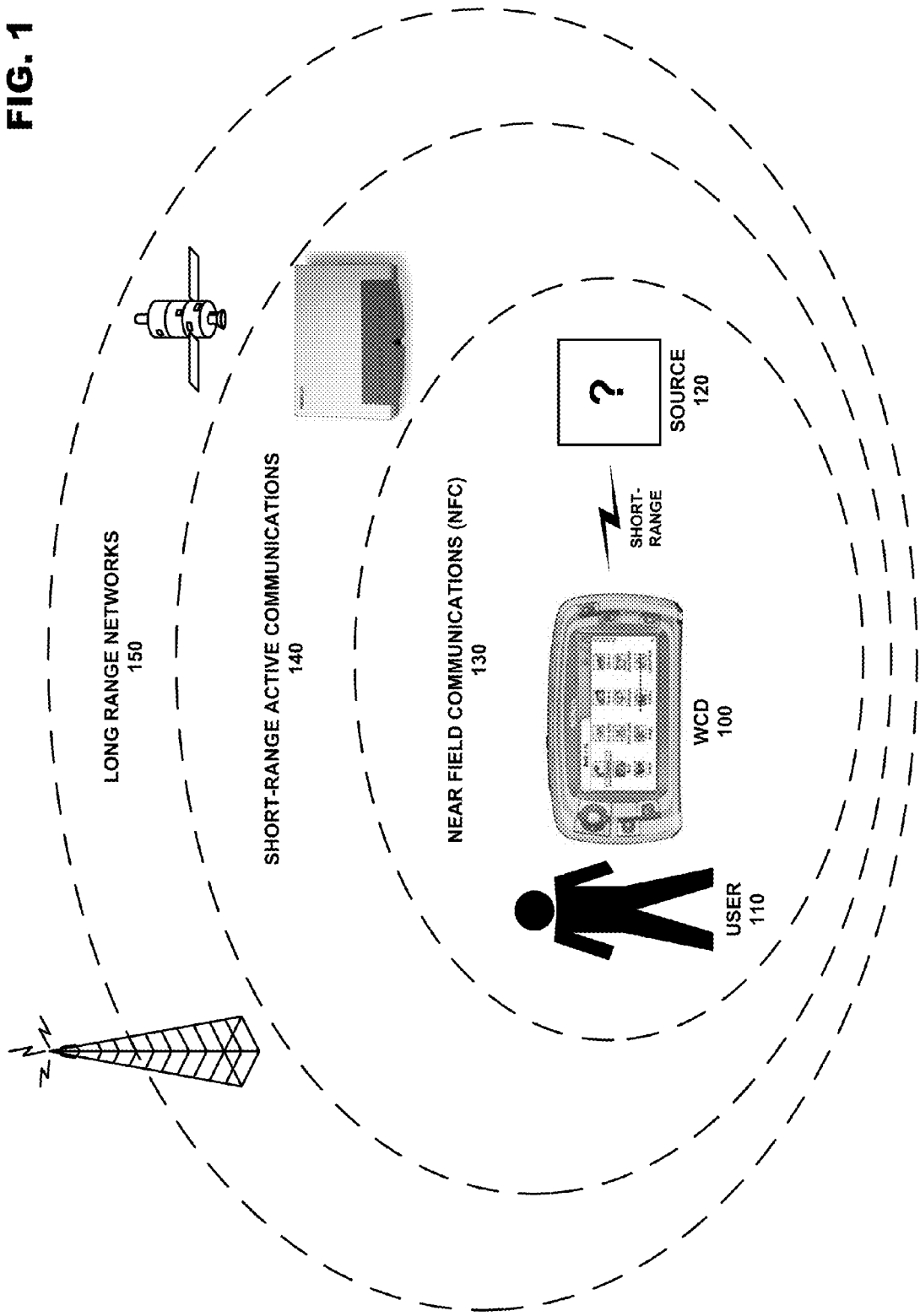
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
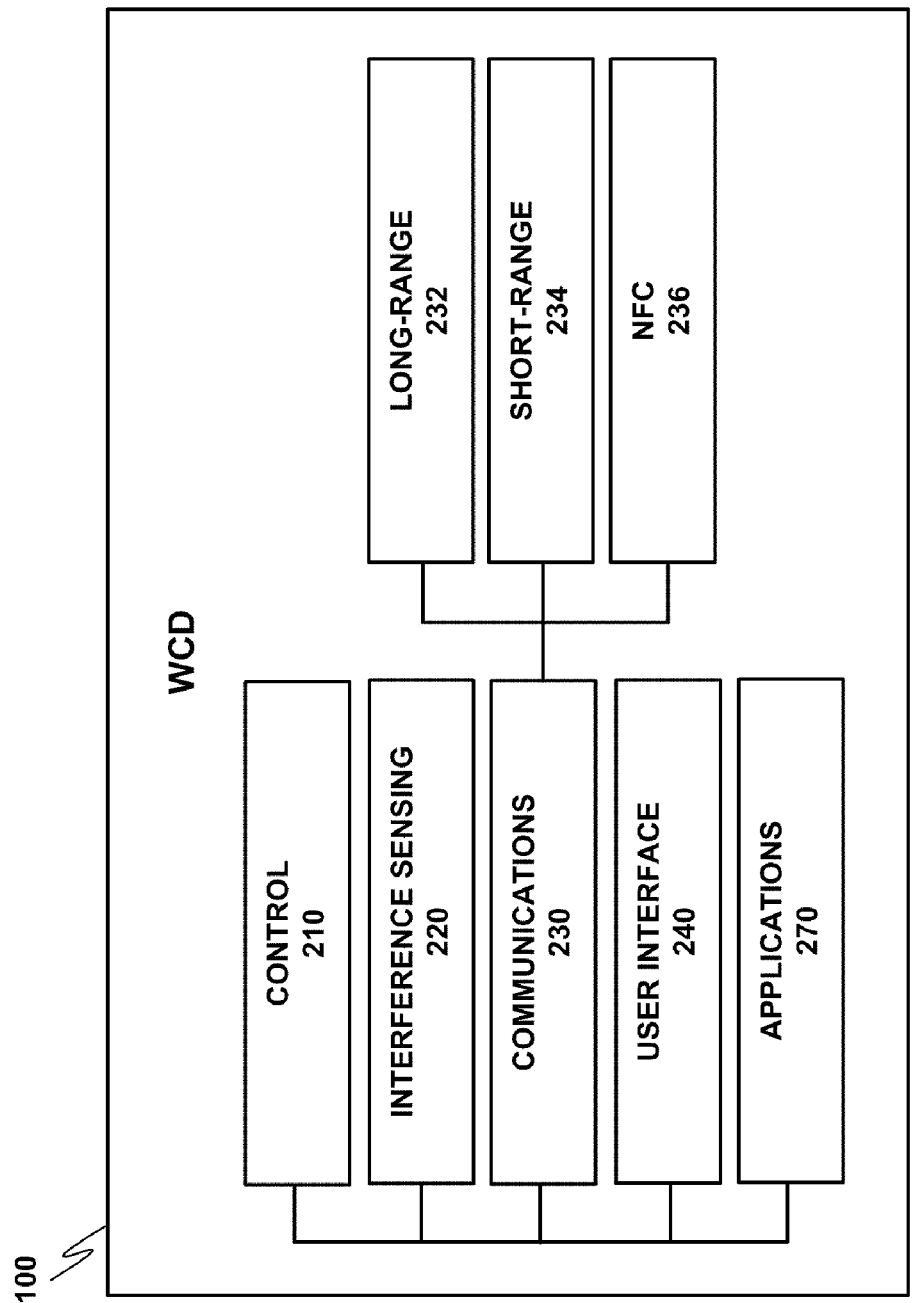
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
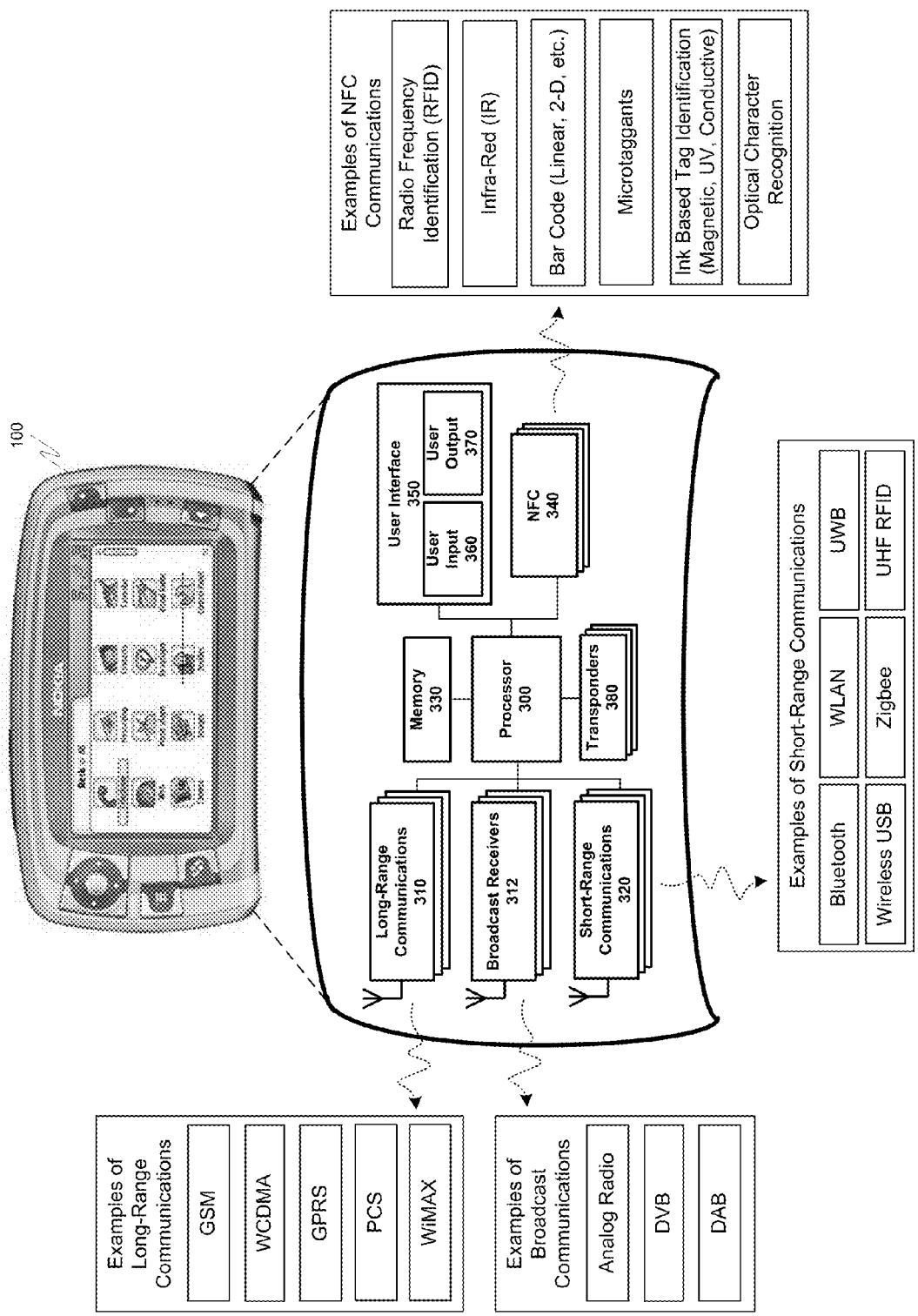
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

NFC 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
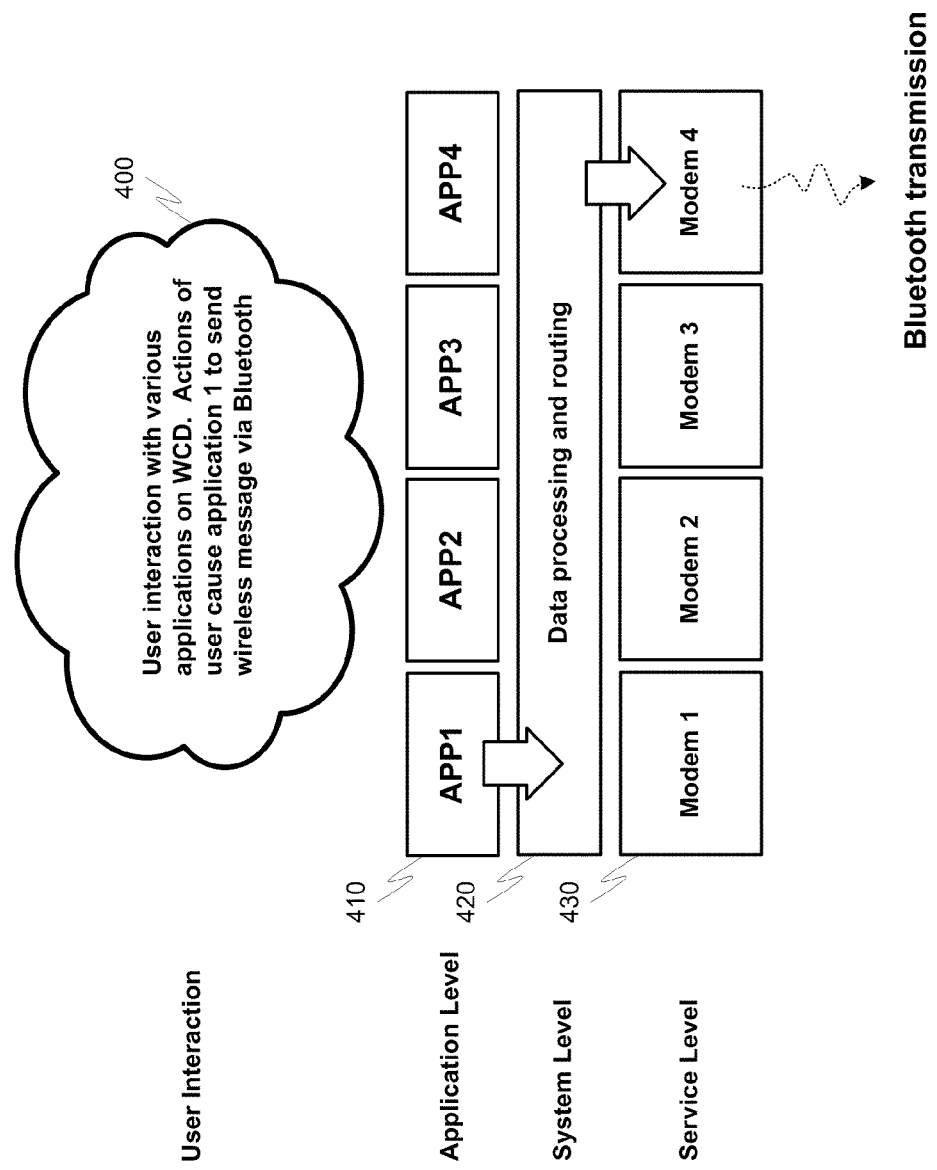
FIG. 4 discloses an exemplary operational description of a wireless communication device utilizing a wireless communication medium in accordance with at least one embodiment of the present invention.

FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
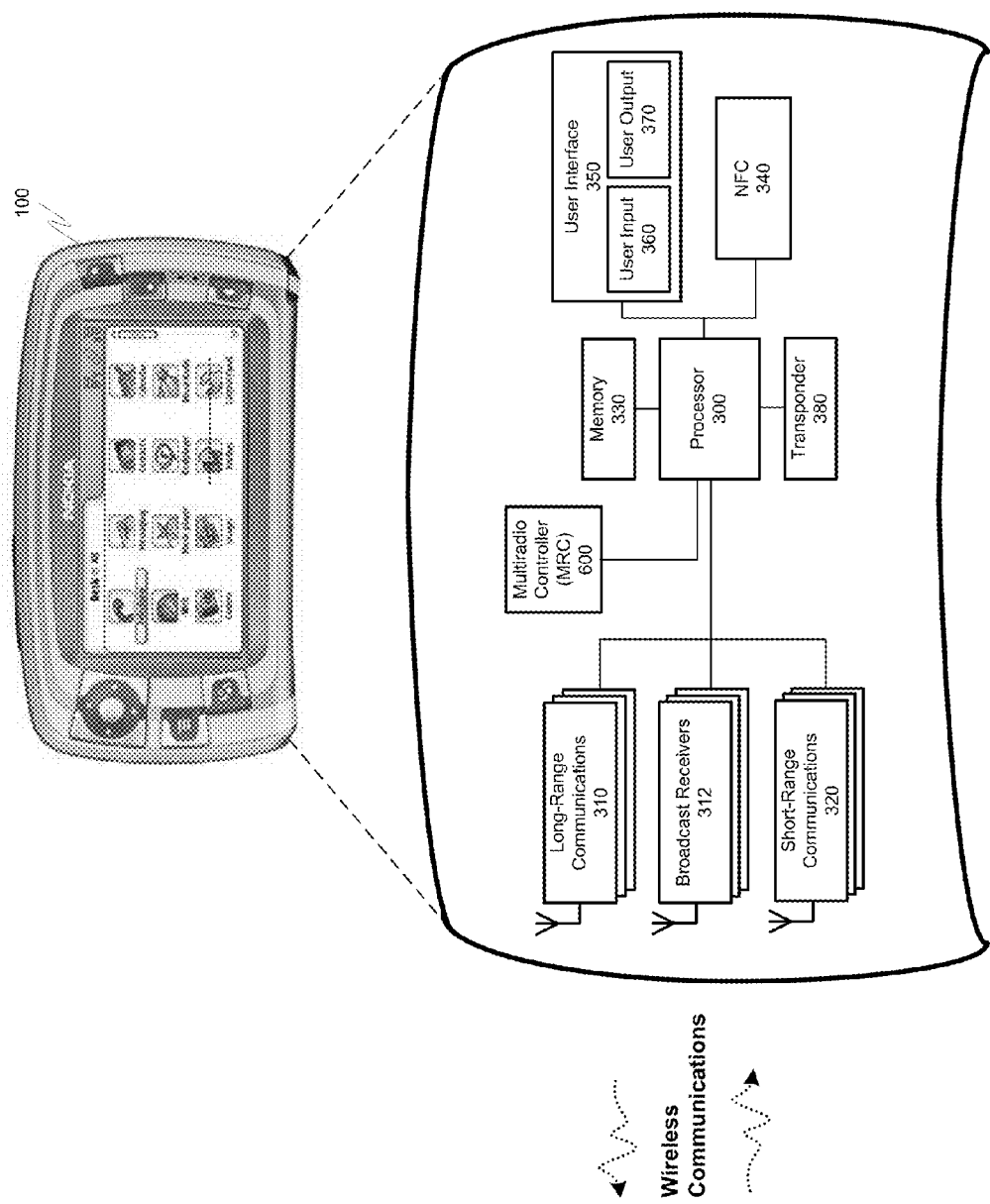
FIG. 6A discloses an exemplary structural description of a wireless communication device including a multiradio controller in accordance with at least one embodiment of the present invention.
Figure 6B:
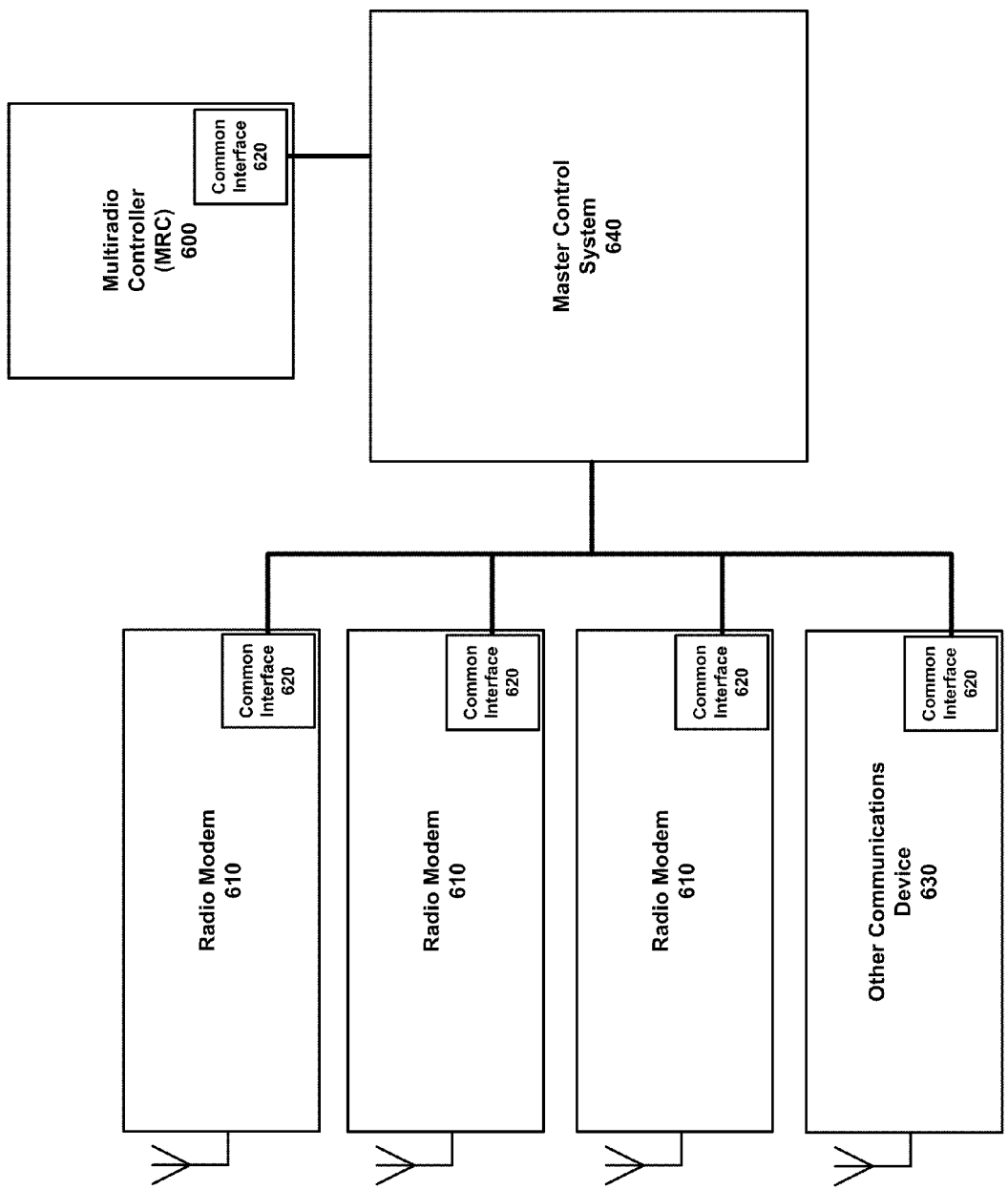
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
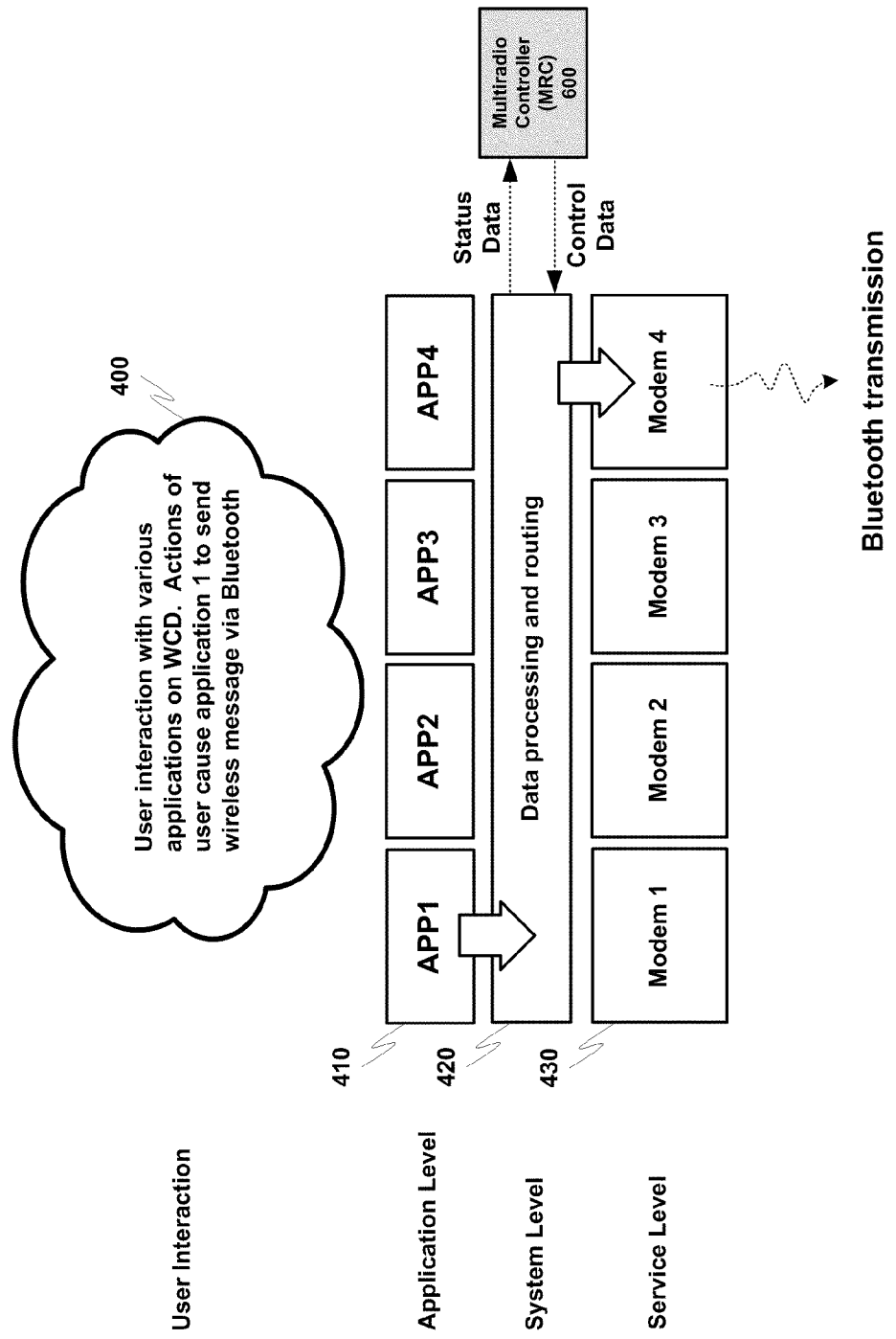
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
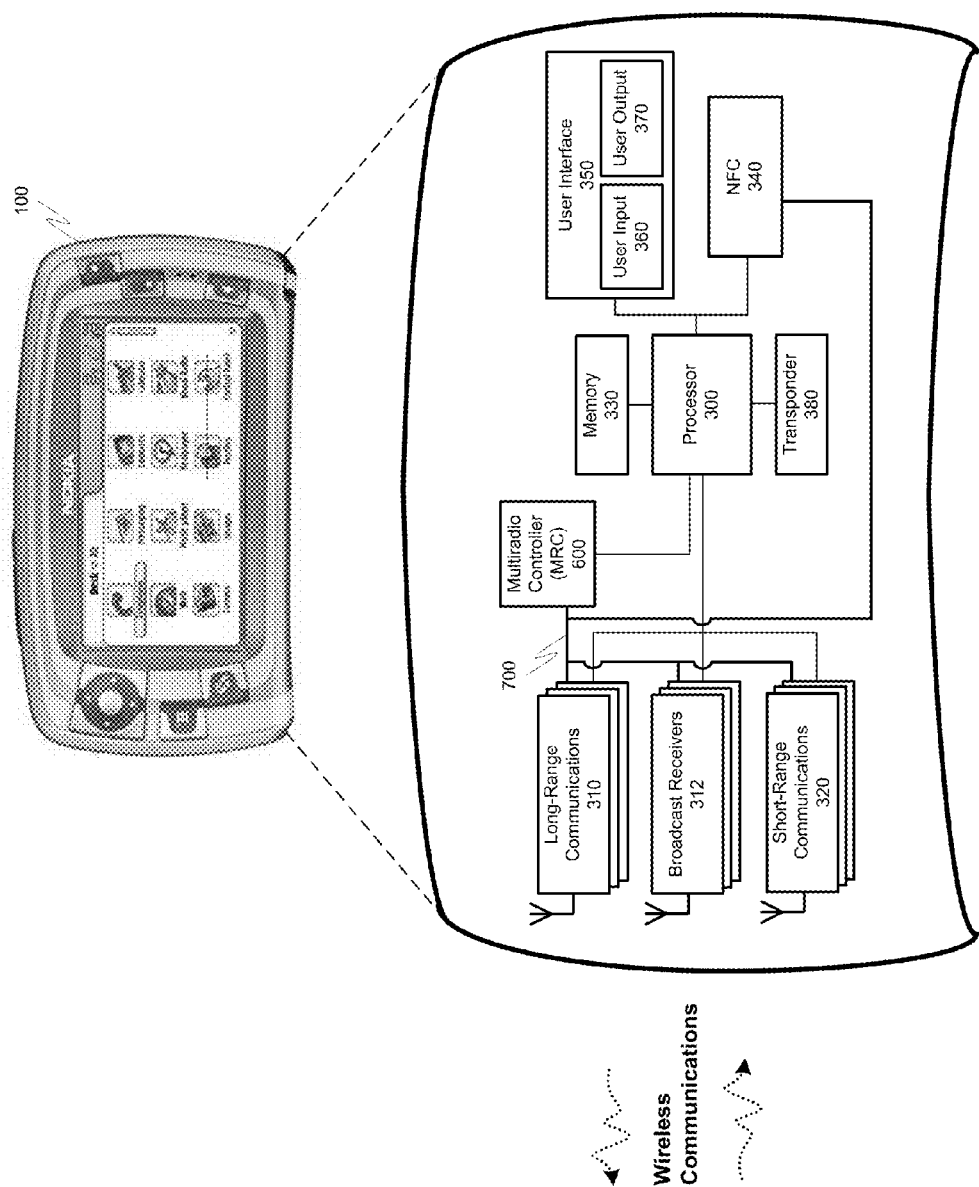
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Figure 7B:
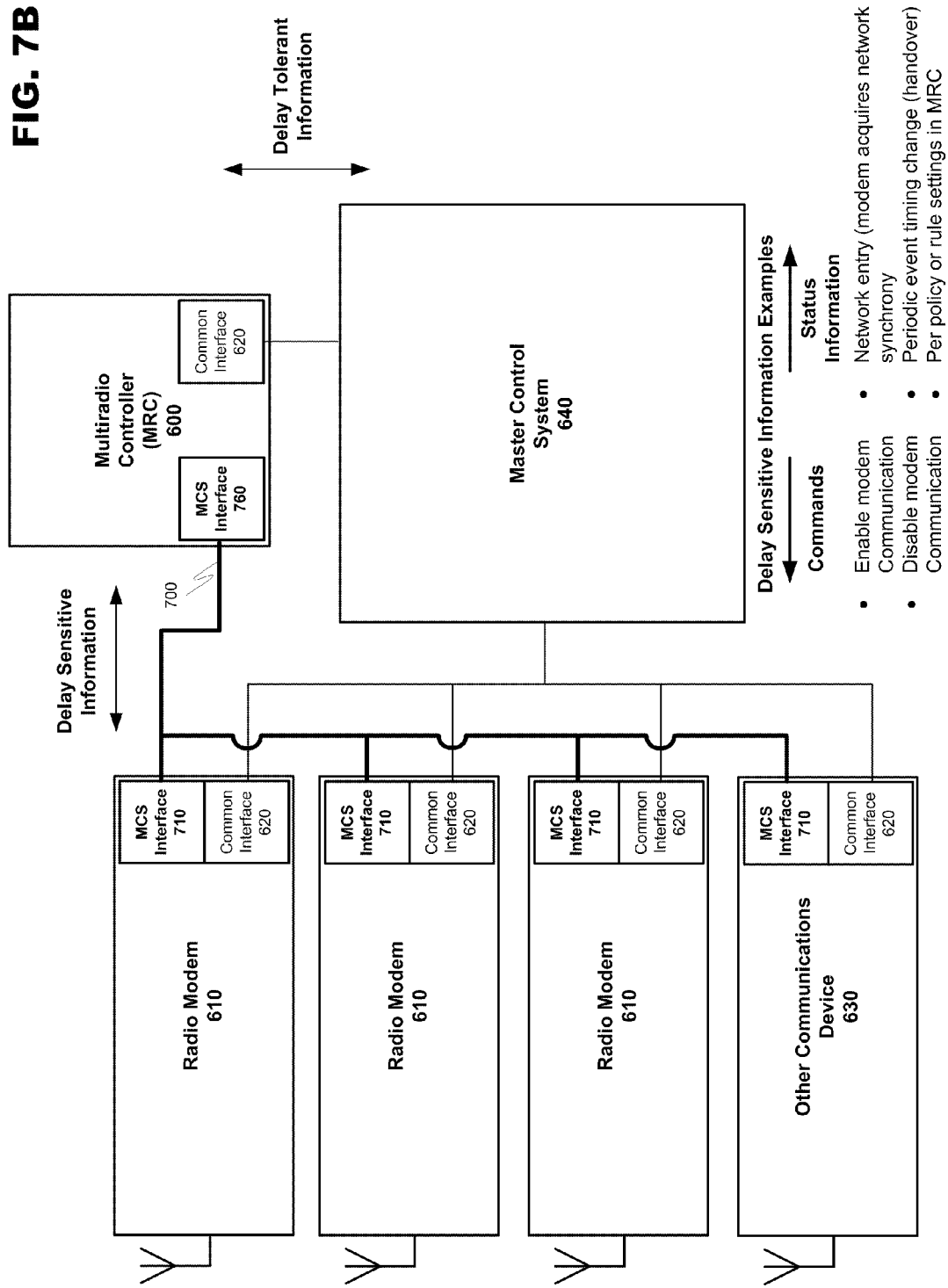
FIG. 7B discloses a more detailed structural diagram of FIG. 7A including the multiradio control system and the radio modems.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System.

Figure 8A:
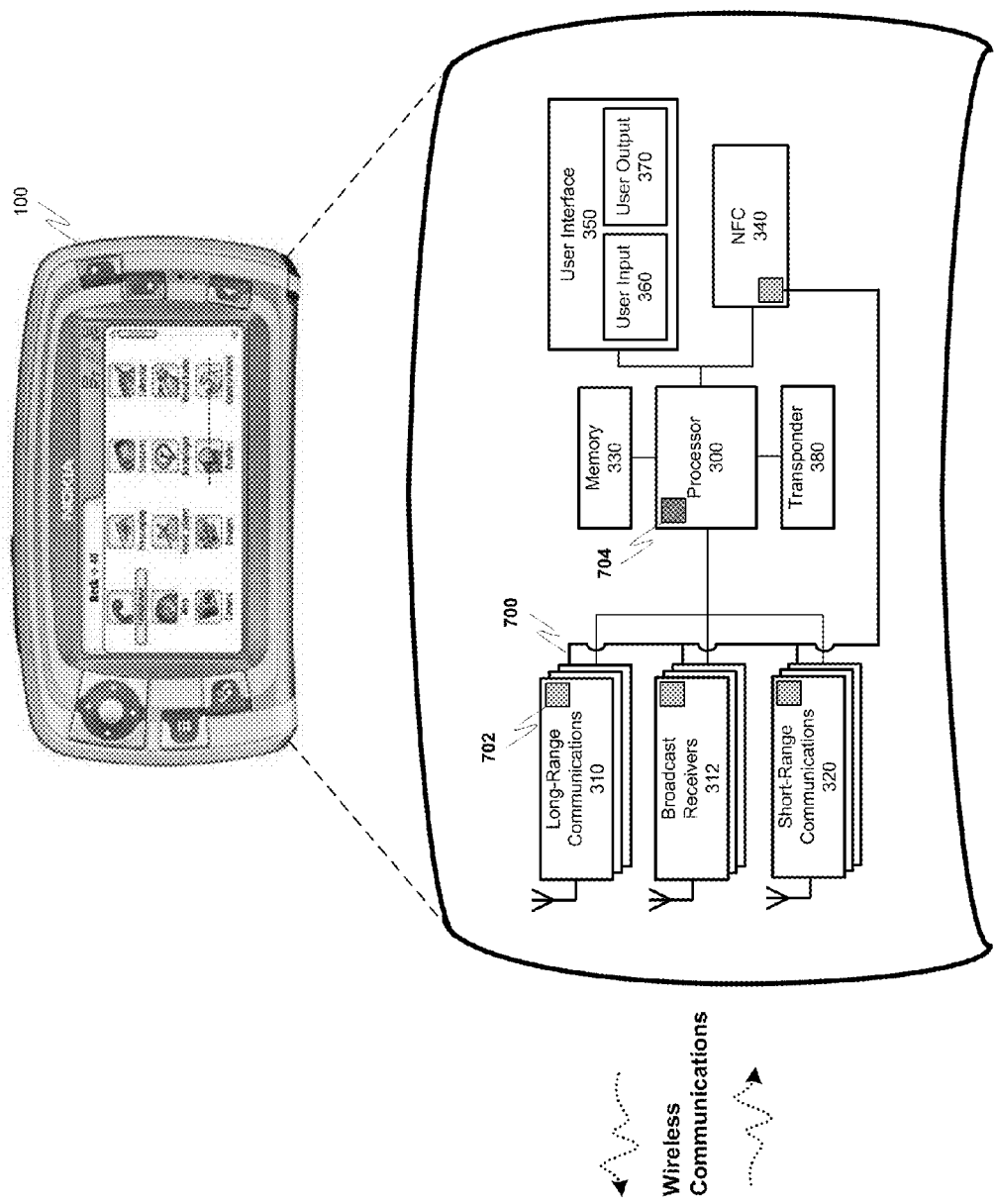
FIG. 8A discloses an exemplary structural description of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems (modules) 610, reducing the overall amount of control command traffic in WCD 100.

MCS 700, in this example, may be implemented utilizing a variety of bus structures, including the I$^2$C interface commonly found in portable electronic devices, as well as emerging standards such as SLIMbus that are now under development. I$^2$C is a multi-master bus, wherein multiple devices can be connected to the same bus and each one can act as a master through initiating a data transfer. An I$^2$C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I$^2$C and I$^2$S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
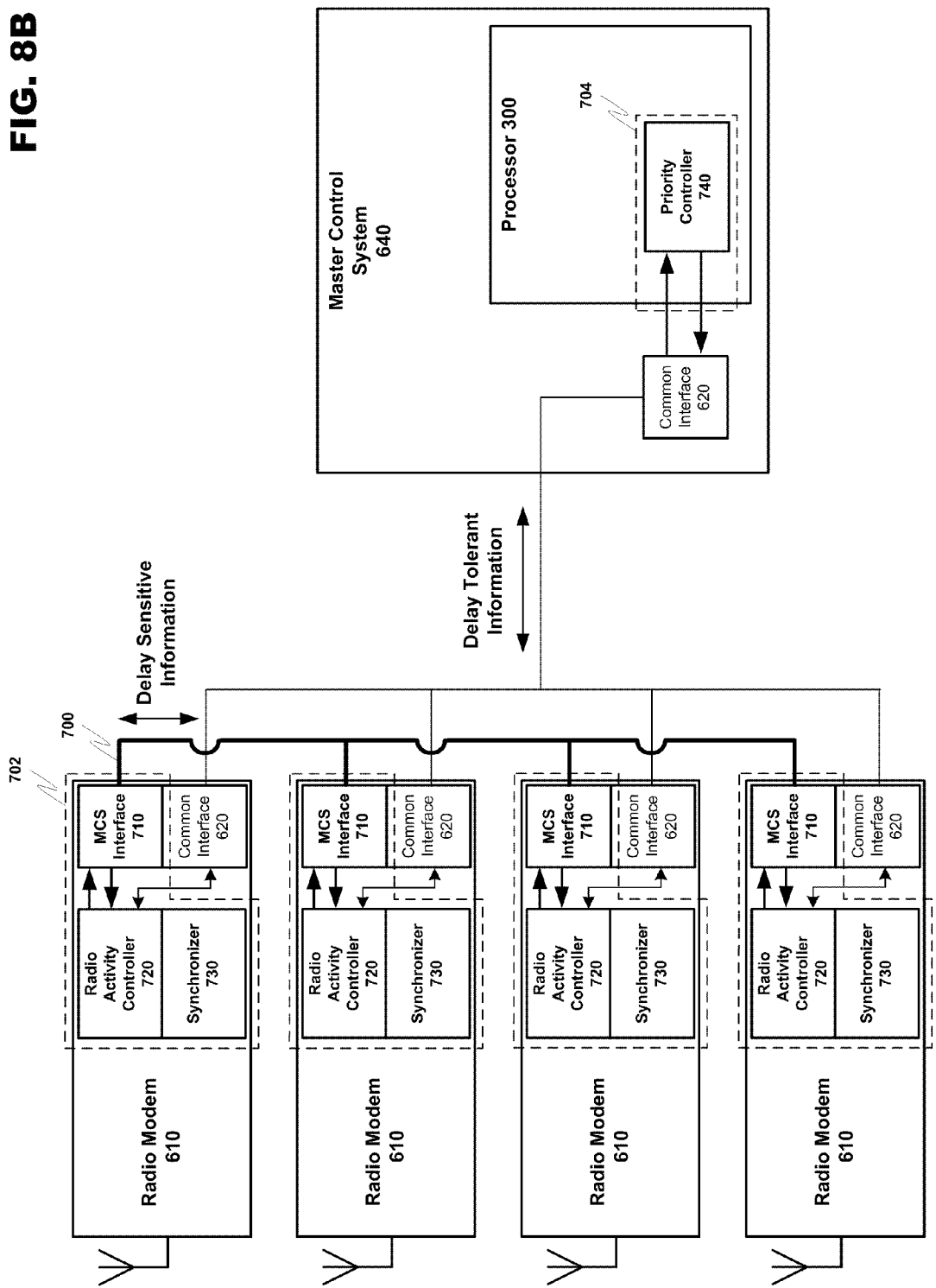
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 (together forming a "module") may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
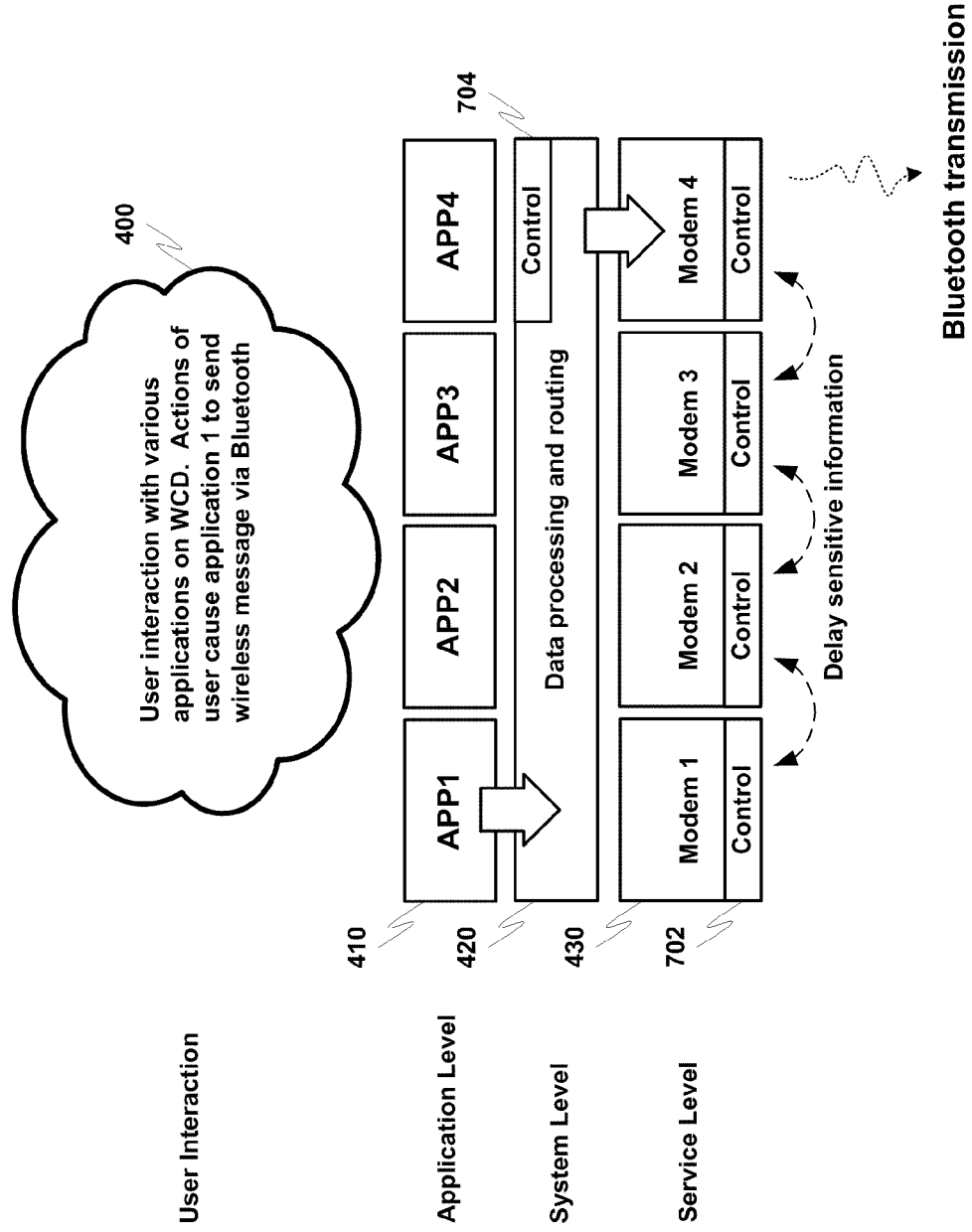
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™ WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

For predictive wireless communication mediums, the radio modem activity control may be based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 µs, followed by an empty slot after which is the reception slot of 577 µs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. A Wireless Communication Device Including an Alternative Example of a Distributed Multiradio Control System.

Figure 9A:
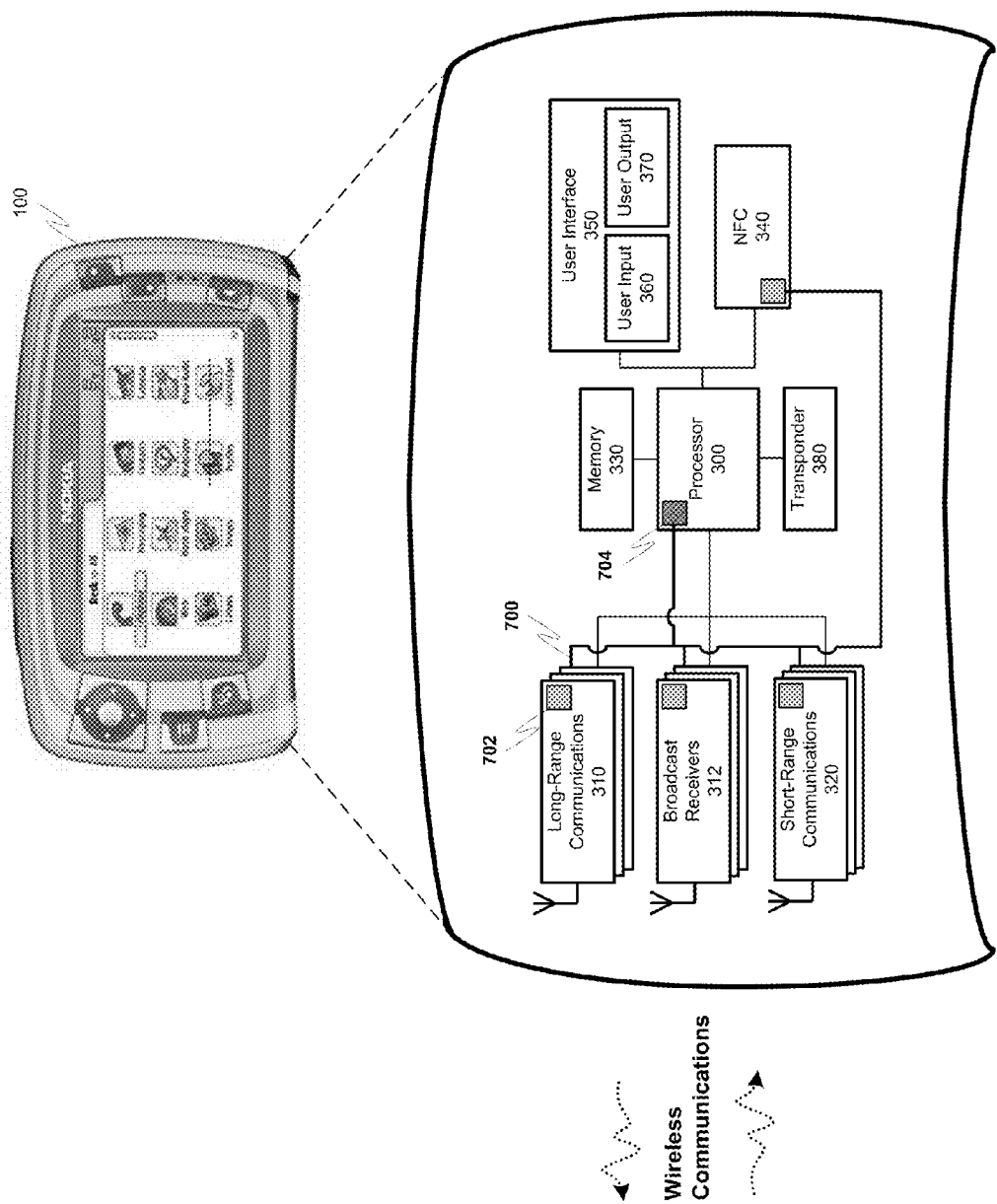
FIG. 9A discloses an exemplary structural description of a wireless communication device including a distributed multiradio control system in accordance with an alternative embodiment of the present invention.
Figure 9B:
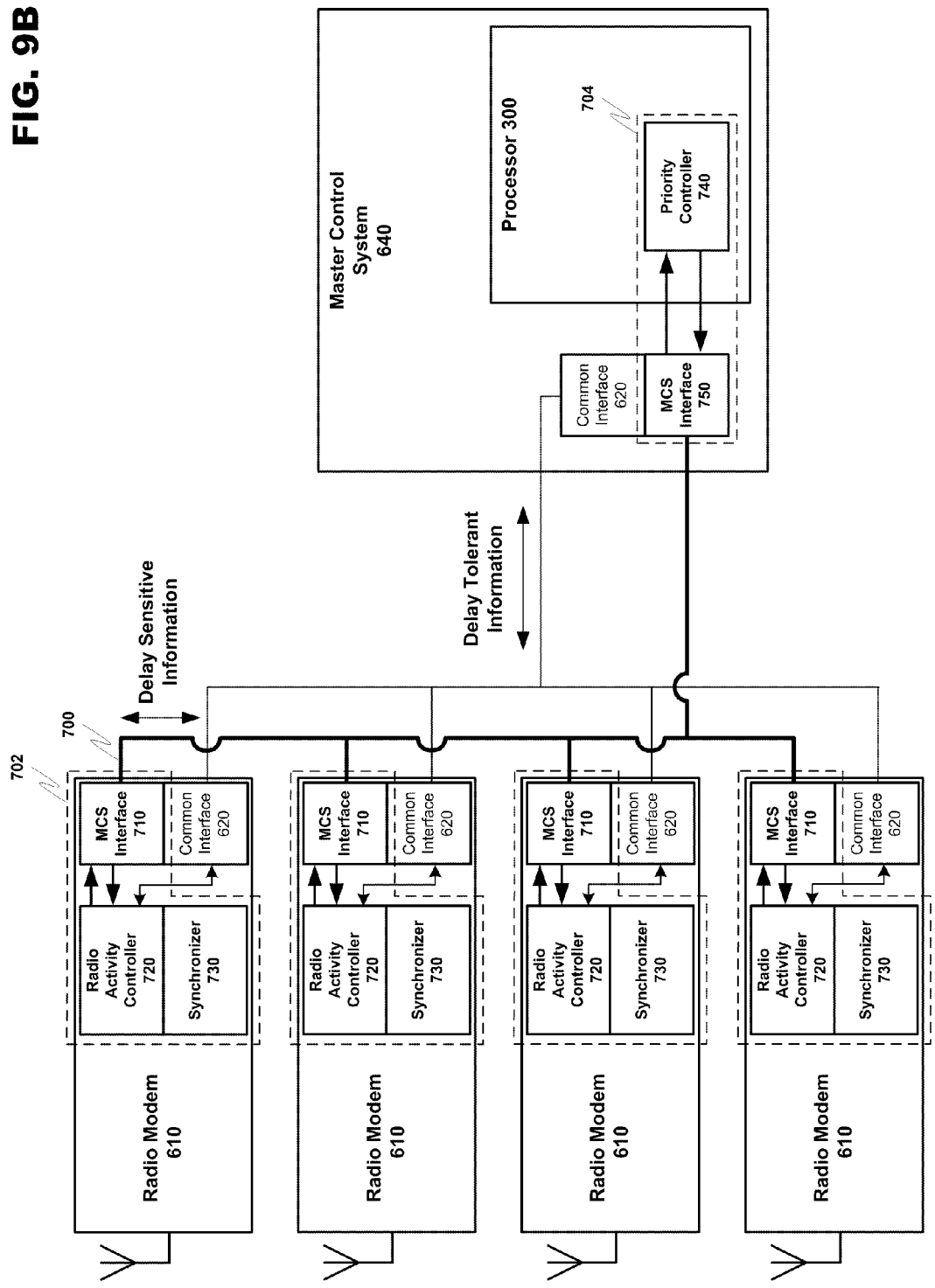
FIG. 9B discloses a more detailed structural diagram of FIG. 9A including the distributed multiradio control system and the radio modems.

An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Management of Unscheduled Wireless Communication Mediums in Radio Modules.

FIG. 11A discloses a system for controlling an unscheduled wireless medium, such as WLAN, in a radio modem or module 610 in accordance with at least one embodiment of the present invention. While WLAN has been used for the sake of explanation in the following disclosure, the present invention is not limited only to WLAN, but may instead by employed to manage any wireless communication medium that may act in an unscheduled manner. This embodiment is distinct from the distributed solution previously discussed in this disclosure, which is clearly shown in FIG. 11A. Example 1100 includes a local controller 1102 integrated within the centrally controlled configuration of the present invention. In this scenario, MRC 600 may still retain primary control over the operations of all modems in WCD 100, however, local controller 1102 may act to control the activity of the particular radio modem 610 to which it is coupled within the parameters defined by MRC 600. While local controller 1102 is shown as a component of the module making up radio modem 610, this controller may also be a separate component coupled to radio modem 610 via common interface 620 or MCS interface 710.

Example 1110 shows another example wherein a local controller being integrated into a distributed configuration of the present invention, as previously disclosed. Radio Activity Controller 720 may be revised to include additional functionality for local control, yielding a combined local controller 1112. This functionality may be included as additional software loaded into an existing radio activity controller 720, or as a totally new controller incorporating the functionality of both devices. As stated above, local controller 1112 serves to control the activity of the module to which it is coupled, while still acting within the bounds as set forth by the distributed multiradio control solution. Further, while the local controller is shown as being integrated within Radio Activity Controller 720, this controller may also be a separate component coupled to radio modem 610 via common interface 620 or MCS interface 710.

Figure 11B:
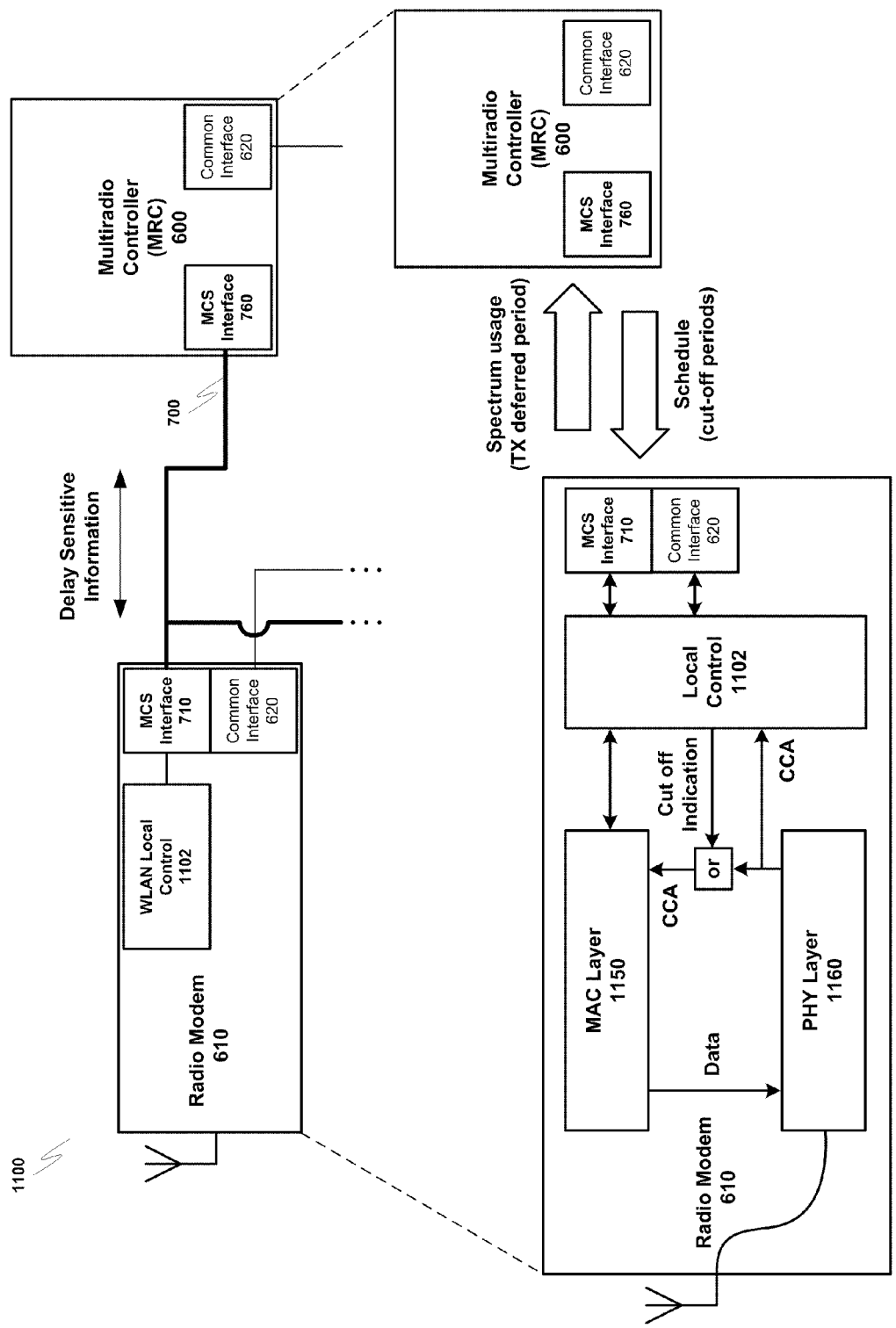
FIG. 11B discloses an exemplary functional diagram of a radio modem including a local controller in accordance with at least one embodiment of the present invention.

FIG. 11B uses example 1100 first presented in FIG. 11A in order to further describe how local controller 1102 may be integrated within the system of radio modem 610. Local control 1102 may be coupled to one or both of common interface 620 and MCS interface 710 in order to receive information from and send information to MRC 600. The information received from MRC 600 may include schedule information for the radio modem 610 which is being managed by local controller 1102. Information sent from local controller 1102 to MRC 600 may include spectrum usage information, such as an indication of when the modem is actually transmitting or receiving information, information regarding messages queued for transmission, information regarding whether the message waiting to be sent has already been deferred, information about the current state of a back-off timer, etc. Local control 1102 may further receive information from the media access control layer (MAC) 1150 in and the physical layer (PHY) 1160 in radio modem 610. The MAC is the layer that may control access for messages sent to the PHY layer, which includes at least the hardware resources utilized to send these messages via wireless communication in radio modem 610. These layers may also provide information to local controller 1102, such as statistics about messages queued for transmission, and carrier sensing including both the actual sensing of wireless traffic through clear channel assessment (CCA), or by virtual carrier sensing by monitoring message parameters such as a network allocation variable (NAV). CCA may include information pertaining to the condition of a channel commonly utilized by radio modem 610 for the wireless transmission of information. This information may be obtained, for example, through a process wherein radio modem 610 uses resources in PHY layer 1160 to measure the energy signals on a particular channel. If the energy signals are deemed to be above a certain level, then the channel is considered to be in use, and is therefore not available for use by radio modem 610. NAV, on the other hand, is an indicator, maintained by each radio modem 610, of time periods when transmission onto the wireless medium will not be initiated by radio modem 610, regardless of whether radio modem senses the carrier is busy through CCA, and may further take into account the duration field in any received frame header. For example, if the start of a WLAN frame is received, the carrier will be busy for at least the duration of the complete transaction (including the message frame and acknowledgement). When the NAV value is greater than 0, the "channel busy" time can be known beforehand and may be used, in addition to CCA, to indicate the current channel state.

In an exemplary interaction between the above-identified entities in, local controller 1102 may receive schedule information from MRC 600, message queue and NAV information from MAC layer 1150, and CCA information from PHY layer 1160. The schedule information may be processed in order to yield a cut off indication. The cut off indication may, for example, be "true" or "high" during periods when no time has been allocated for radio modem 610 to operate. This may occur when time has been allocated to another radio modem 610 utilizing a possibly conflicting wireless communication medium. CCA signal may likewise be "true" or "high" when the communication channel is busy, for example, when another device (outside of WCD 100) is using the channel. These two signals may be combined in a logical "OR" and fed to MAC layer 1150. As a result, when either of these two signals are "true" or "high" the resulting signal will be high, indicating to MAC layer 1150 that access to the physical layer should be restricted. When these two prohibitive conditions pass, then MAC layer may again allow messages to proceed to the physical layer for immediate wireless transmission. While this system may account for schedule and channel availability, there is still no accounting for whether a message to be sent from modem 610 can be fully completed in the allowed time.

Referring now to FIG. 12A, a problematic scenario which at least one embodiment of the present invention seeks to correct is now analyzed. The operation of an unscheduled wireless communication medium is mapped out in FIG. 12A. An operational schedule defined by MRC 600 is shown compared to what is actually occurring in the communication medium. The grey areas in the MRC schedule signify a period when radio modem 610 is permitted to operate. Time not allocated to radio modem 610 may be reserved for other wireless resources in WCD 100. The WLAN schedule below the MRC schedule show an exemplary wireless transaction that may occur during this time period. Normal traffic can begin after the medium has been idle for at least DIFS (distributed coordination function inter-frame space). Then during the contention window stations attempting to transmit select a random back-off counter value, and decrement the counter by one after each back-off slot where the communication channel is determined to be idle, signifying that no traffic has been detected on the channel. Once the counter reaches zero and the medium is still idle, the transmit frame can begin. The DIFS period and contention window are the periods of time when carrier sensing is occurring. When the transmission of the frame has been completed (as is in the case of Frame 1 shown in FIG. 12A) an acknowledgement frame may then be returned from the device that received the original frame 1, and the transaction may be deemed complete in radio modem 610.

However, a problem is seen with respect to the transmission of frame 2. In this example, an extended period of contention and possibly more information contained in the frame has pushed the completion of this frame outside of the allowed air access time. This may be seen, for example, where the NAV for the next queued message includes duration information showing that the transaction will exceed the time allocated to radio modem 610. As a result, the entire frame 2 will not be transmitted to the receiving device, and further, no acknowledgement will be received. This situation may require the retransmission of the frame, which may again fail if the situation in the next available transmission period resembles the scenario for exemplary frame 2. The resources for one or more radio modems 610 may then become depleted due to these retransmissions, possibly impairing the overall communication performance in WCD 100.

Figure 12B:
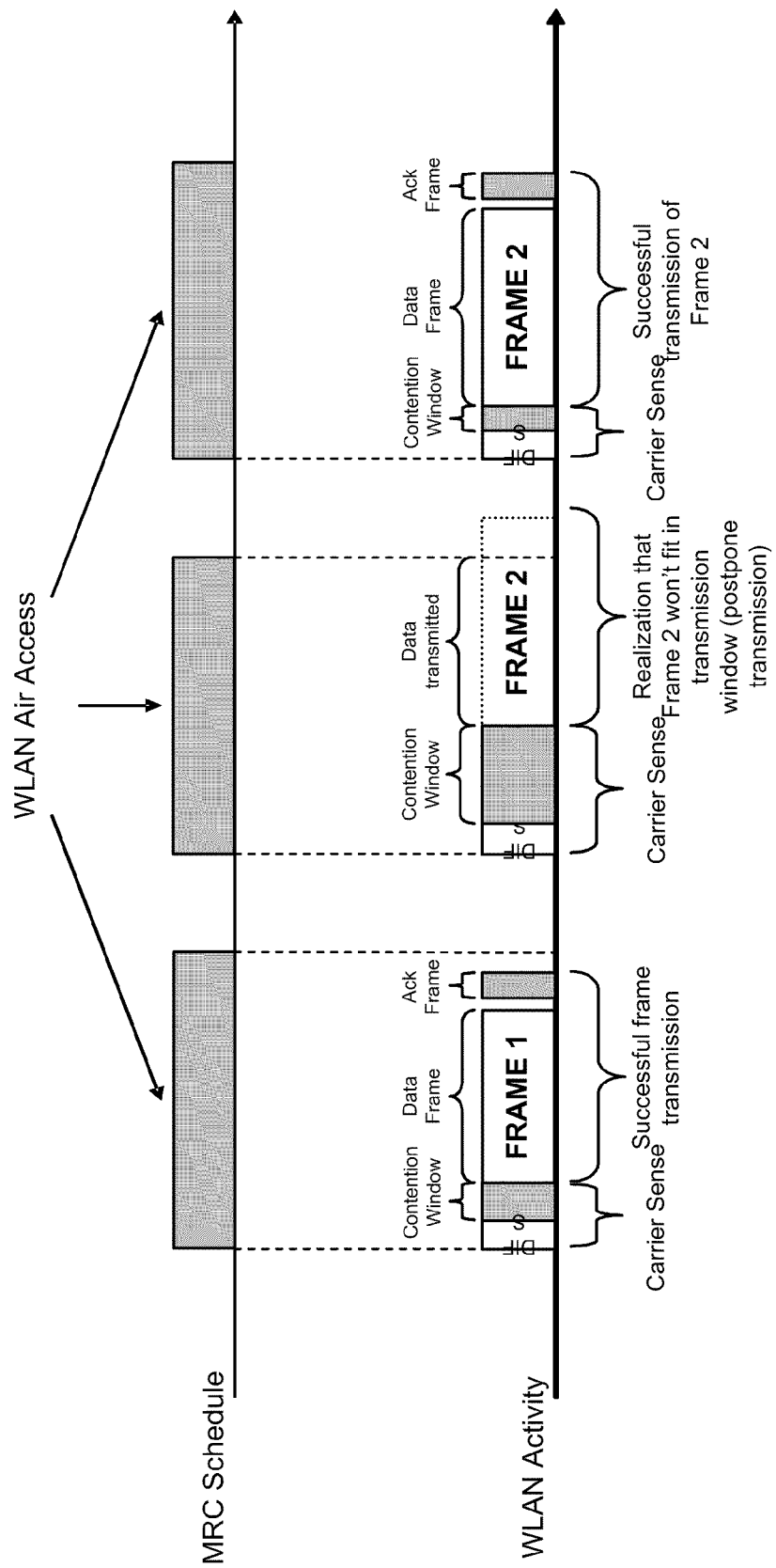
FIG. 12B discloses an example of an unscheduled wireless communication medium transmission management in accordance with at least one embodiment of the present invention.

FIG. 12B now discloses a solution to the problem discussed above with respect to frame 2 in accordance with at least one embodiment of the present invention. In FIG. 12B local controller 1102 is receiving information about messages queued for transmission via radio modem 610, for example, from MAC layer 1150. This information may include at least the size of the messages so that local controller may determine a predicted amount of time for transmission in view of current radio modem performance, or alternatively, a predicted amount of time of for transmission may be provided directly from MAC layer 1150. For example, if the NAV shows that a channel is busy longer than WLAN has air access, radio modem 610 may inform MRC 600 that it cannot transmit within the allowed time. Using this information, an algorithm for determining whether a transaction should proceed may be formulated using the MRC schedule, carrier sensing via CCA and/or NAV, and predicted message completion time.

In the example presented with respect to frame 2 in FIG. 12B, initially it is determined through carrier sensing that due to the extended contention period there is not enough time remaining in the transmission window to complete the transaction. Again, depending on the communication configuration in radio modem 610 and/or generally in WCD 100, completing a successful transmission may require both the successful sending of the complete frame and the receipt of the Acknowledgement frame. No benefit is realized if the entire frame 2 is sent but no acknowledgement frame is received since the system will be forced to consider the message as failed and resend the message. In the next WLAN air access period allocated to radio modem 610, the combined DIFS and contention window is short, providing enough time for the entire transaction, as predicted, to complete. In this manner, the frequency of failed communication transactions (and retransmissions) for an unscheduled wireless communication medium may be reduced, and the overall communication efficiency in WCD 100 may be improved.

Now that an exemplary system has been set forth in accordance with at least one embodiment of the present invention, specific examples of operation may be further explained. In a first operating scenario, a WLAN radio modem 610 may be initiating transmission (i.e. the contention period has ended). The schedule information provided by MRC 600 indicates that transmission rights will be cut off before the packet transmission is completed. WLAN radio module 610 may then defer the packet transmission to a later time when an adequate period is available, and as a result, saves power and reduces spectrum clutter (see, for example, FIG. 12B). In another scenario, radio modem 610 may preemptively defer transmission before the contention period has ended. For example, if during the contention period radio modem 610 sets NAV (e.g., receives a packet not addressed to itself) and the NAV+estimated packet transmission time is greater than the allocated schedule time, the frame cannot be transmitted successfully. Also, if NAV alone is greater than the available air access time, WLAN cannot even decrease contention counter before the air access window ends. The time remaining in the schedule for radio modem 610 may then be reported to MRC 600, which may reallocate this time to other modems, or alternatively, if communication within WCD 100 is fast, MRC 600 may be able to allocate additional time to radio modem 610 in order to allow the transaction to complete.

X. Back-Off Timing.

Figure 13A:
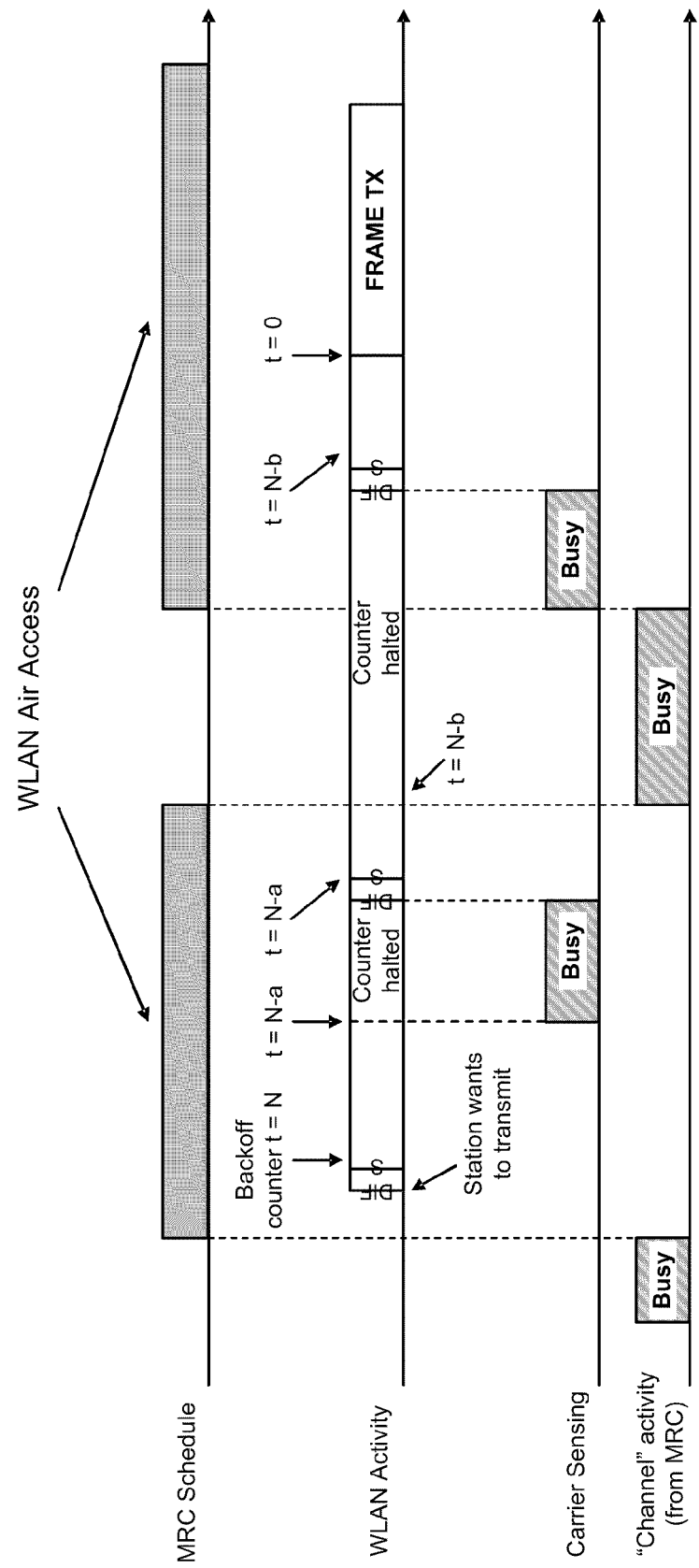
FIG. 13A discloses a back-off timing control diagram for an example communication scenario in accordance with at least one embodiment of the present invention.

FIG. 13A discloses an exemplary back-off timing diagram in accordance with at least one embodiment of the present invention. A back-off countdown may occur after DIFS in order to provide a random offset which may in turn prevent the simultaneous start of communication for multiple wireless transmitting devices on the same channel. A back-off counter value may be chosen at random, which then decremented for each time slot wherein carrier sensing determines that the carrier is still available. In accordance with the present invention, the operation of the back-off counter may be enhanced by accounted for time periods where it is known that the carrier will not be available, such as time indicated as occupied by the MRC schedule along with time periods where the carrier is sensed to be unavailable.

As disclosed in the exemplary timeline of FIG. 13A, information regarding whether a channel is available from a scheduling and carrier sensing standpoint may be used to control the behavior of the back-off counter. Initially, a random value is chosen for the back-off counter (in this example "N"). When the counter starts, N is decremented for each time slot the carrier sensing detects that the transmission channel is free. However, an instance occurs in this example where the carrier sensing shows the line to be busy while the MRC schedule still has time allocated to the radio modem 610 (time t=N−a). The counter may then be paused until the carrier becomes available. After DIFS, the counter may start again from the same point, wherein t=N−a. The timer may continue to count down until the next pause instant where the MRC schedule no longer permits transmission. This may occur, for example, due to the available transmission time being reserved for another radio modem 610 in WCD 100. At this instant, t=N−b, the countdown time is again paused until both the MRC schedule and carrier sensing again permit transmission. When both criteria are met DIFS may again occur, and then the timer may proceed counting down again from t=N−b until t=0 when radio modem 610 sends the frame.

Figure 13B:
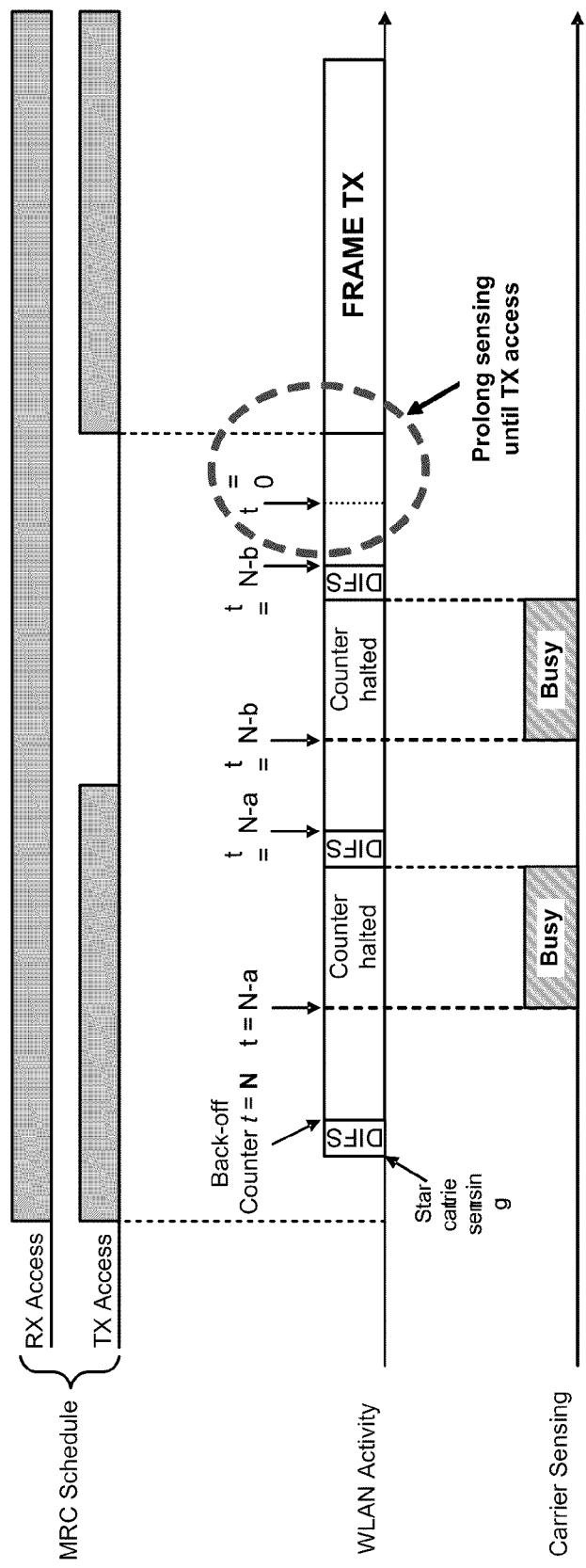
FIG. 13B discloses a back-off timing control diagram for another example communication scenario in accordance with at least one embodiment of the present invention.

In another example of operation, WLAN radio modem 610 may initiate the transmission procedure (i.e., carrier sensing including DIFS and the contention window period), only to be interrupted by MRC 600 cutting off transmission rights during the contention period but continuing to allow reception. This is a scenario depicted in FIG. 13B, wherein the MRC schedule is further defined to include a receiving schedule (RX) and a transmission schedule (TX). Contention may continue (including the back-off counter countdown) normally if at least reception is allowed. If the back-off counter reaches zero after the transmission rights have been restored, normal packet transmission may proceed (e.g., the first scenario discussed above may operate here). However, a problem may occur when the back-off timer reaches zero without TX permission being restored. If the back-off counter reaches zero during the transmission cut-off period (depicted in the area highlighted in the dashed oval in FIG. 13B), the transmission may be delayed until rights are restored to radio modem 610. Transmission may then begin immediately if the channel is still idle (e.g., the first scenario). This behavior may increase the throughput of radio modem 610 and improve the overall efficiency of WCD 100.

When a radio modem 610 utilizing an unscheduled wireless communication medium begins the transmission procedure (e.g., carrier sensing including DIFS and a contention window period), it is foreseeable that MRC 600 may cut off both transmission and reception permission. During any reception cut-off period, the radio modem may assume (e.g., because CCA and Cut-Off indication from local controller 1102 are OR-ed as shown in FIG. 11B) that spectrum interference exists, causing local controller 1102 to pause the back-off counter. This idle time may be spent in power-saving mode (e.g., a sleep mode). If both rights are restored at the same time, normal operation may then continue. If reception rights are restored before transmission rights, radio modem 610 may continue according to the similar scenario described above. Alternatively, if transmission rights are restored before reception rights, radio modem 610 waits for reception rights to be restored. This time can be spent in a power-saving mode.

Figure 14:
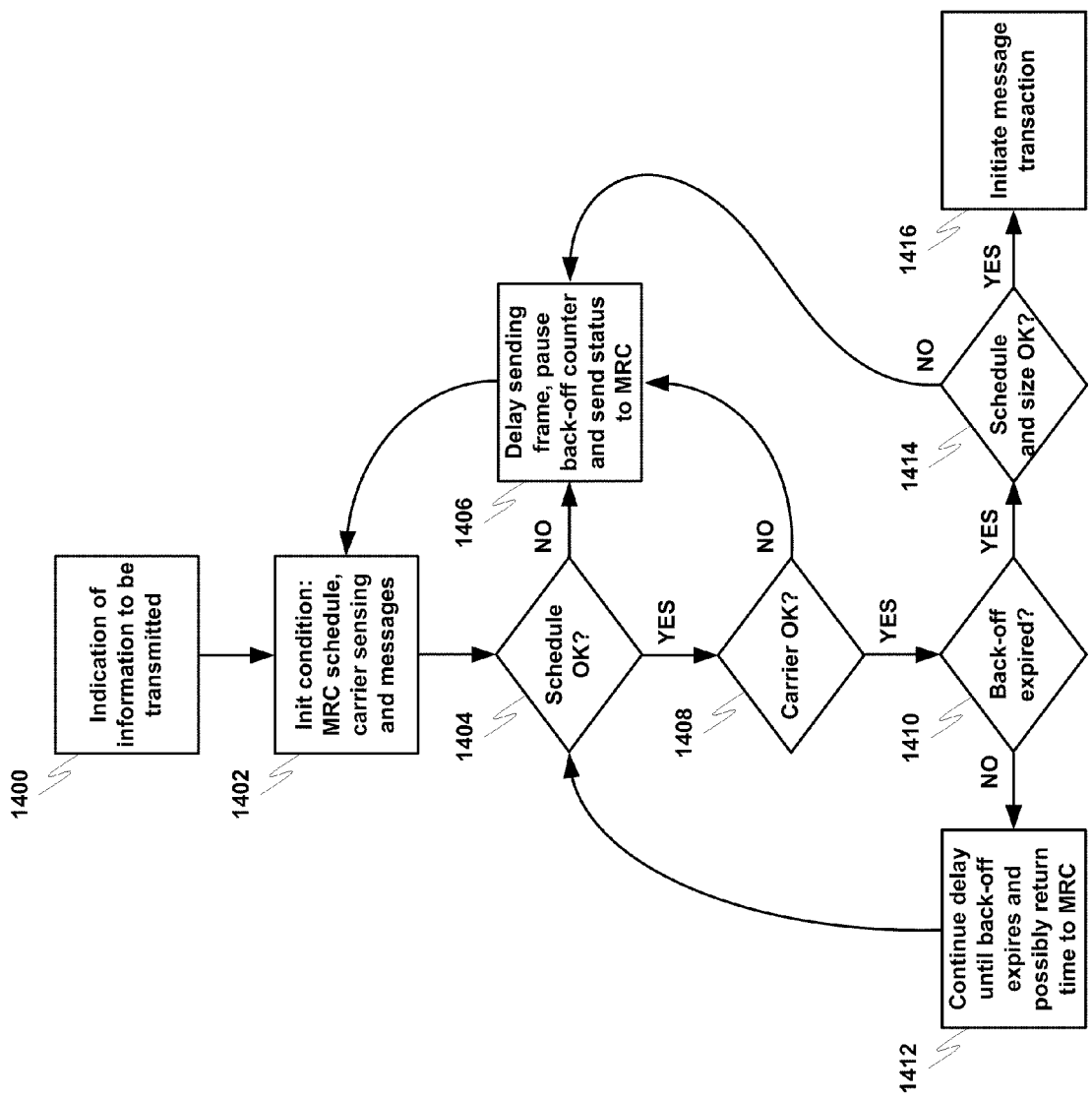
FIG. 14 discloses an exemplary flowchart for managing an unscheduled wireless communication medium in accordance with at least one embodiment of the present invention.

Referring to FIG. 14, a process flow in accordance with at least one embodiment of the present invention is now described. The process begins in step 1400 wherein there is an indication of information (e.g., at least one message) to be transmitted via radio modem 610. Local controller 1102 may then initialize information gathering by obtaining information related to at least MRC operational scheduling, carrier sensing and messages pending for transmission (step 1402). The message information may include, for example, the number of messages pending and/or the length or estimated transmission time for each message. Radio modem 610 may then begin a process of determining whether message transmission is possible. Initially, the MRC schedule may be checked (step 1404). This check may include a determination as to whether radio modem 610 is allowed to communicate (currently within an allocated time period), and if permitted to communicate, whether or not message transmission may be completed (e.g., both message and acknowledgement) in the time allocated. If no time is currently reserved for radio modem 610, or the message may not be completed in the remaining allocated time, then transmission may not proceed. As a result, the pending message may be delayed, the back-off counter may be paused, status information for radio modem 610 may be transmitted to MRC 600, and further, radio modem 610 may enter a power-saving mode until the channel is free.

If adequate time has been allocated for radio modem 610 in the MRC schedule, then in step 1408 the carrier status is checked to determine if any sensed communication is occurring on the channel. If, for example, a power level exceeding a predetermined power level is sensed (e.g., indicating that the channel is busy), then delay and notification actions as previously described with respect to step 1406 may continue until carrier sensing determines the channel to be free. After the carrier sensing determines that the carrier is available, the back-off counter may also be checked in step 1410 to determine if any time remains before the back-off counter reaches zero. If time remains, then in step 1412 the counter continues to run and MRC 600 may be informed of the radio modem 610 status. For each count, the MRC schedule and carrier sensing status may again be checked (e.g., steps 1404 and 1406). Otherwise, if the back-off counter has reached zero, the MRC schedule may again be checked in step 1414 to determine both if transmission is permitted and if the transaction can be completed in the time remaining. Checking the MRC schedule again is important, for example, because as the initial value for the back-off counter is random and the counter is put on hold when the channel is busy, there is no way to define the time needed for carrier sensing until the carrier sensing is completed. If the time remaining is not sufficient, a delay may be required per step 1406. If enough time remains so that the message transaction may be completed, the message frame may be sent in step 1416.

Figure 15:
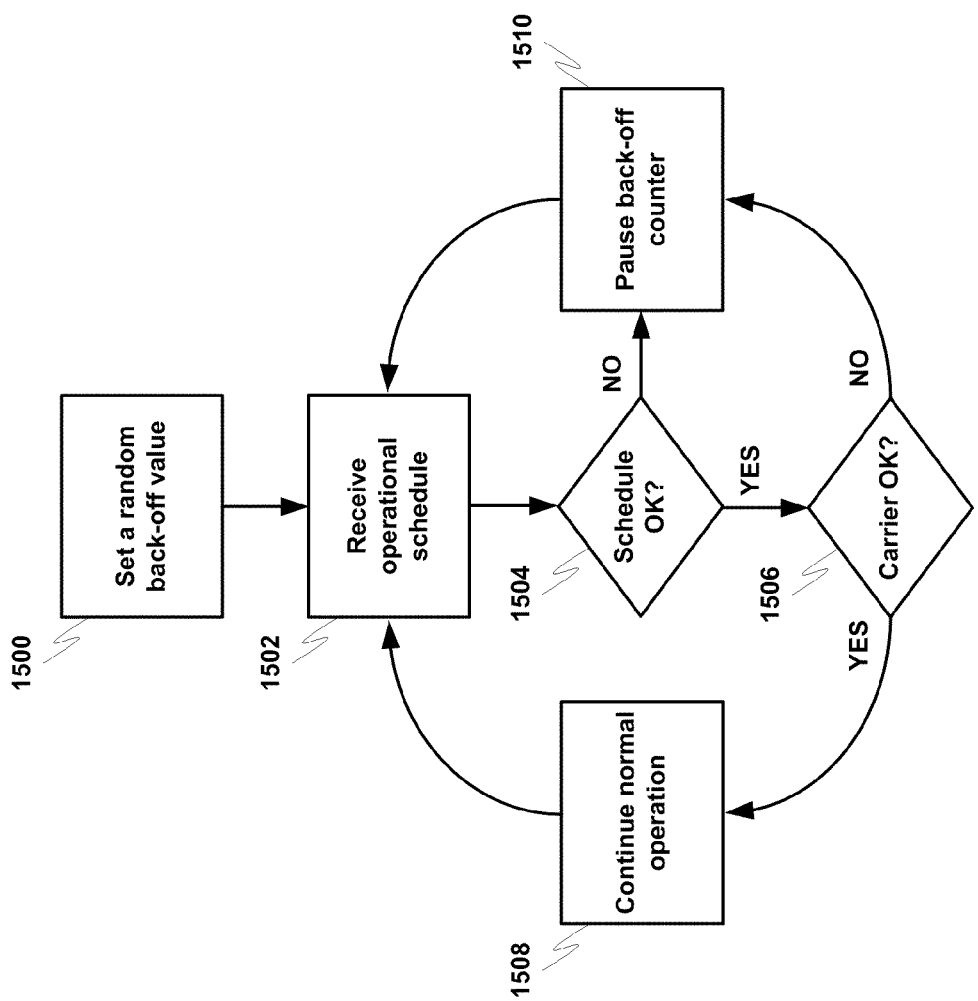
FIG. 15 discloses an exemplary flowchart for implementing a back-off timer with respect to schedule and carrier condition in accordance with at least one embodiment of the present invention.

FIG. 15 discloses another exemplary process flow in accordance with at least one embodiment of the present invention. The process of FIG. 15 describes an example of controlling a back-off counter in view of operational schedule information and carrier status. In step 1500, a random back-off value may be set. This random value may be used as a starting point from which to count down to zero. An operational schedule may be provided by MRC 600 in step 1502, which may be utilized in step 1504 to determine if radio module 610 is allowed to communicate. If the operational schedule does not allow communication, or it is determined that a channel is not available, for example, through carrier sensing (step 1506), then the back off-counter may be paused in step 1510. Otherwise, if communication is allowed by the operational schedule and the carrier is determined to be available, then normal radio module 610 operation in accordance with what has been set forth previously in this disclosure may continue in step 1508.

Figure 16:
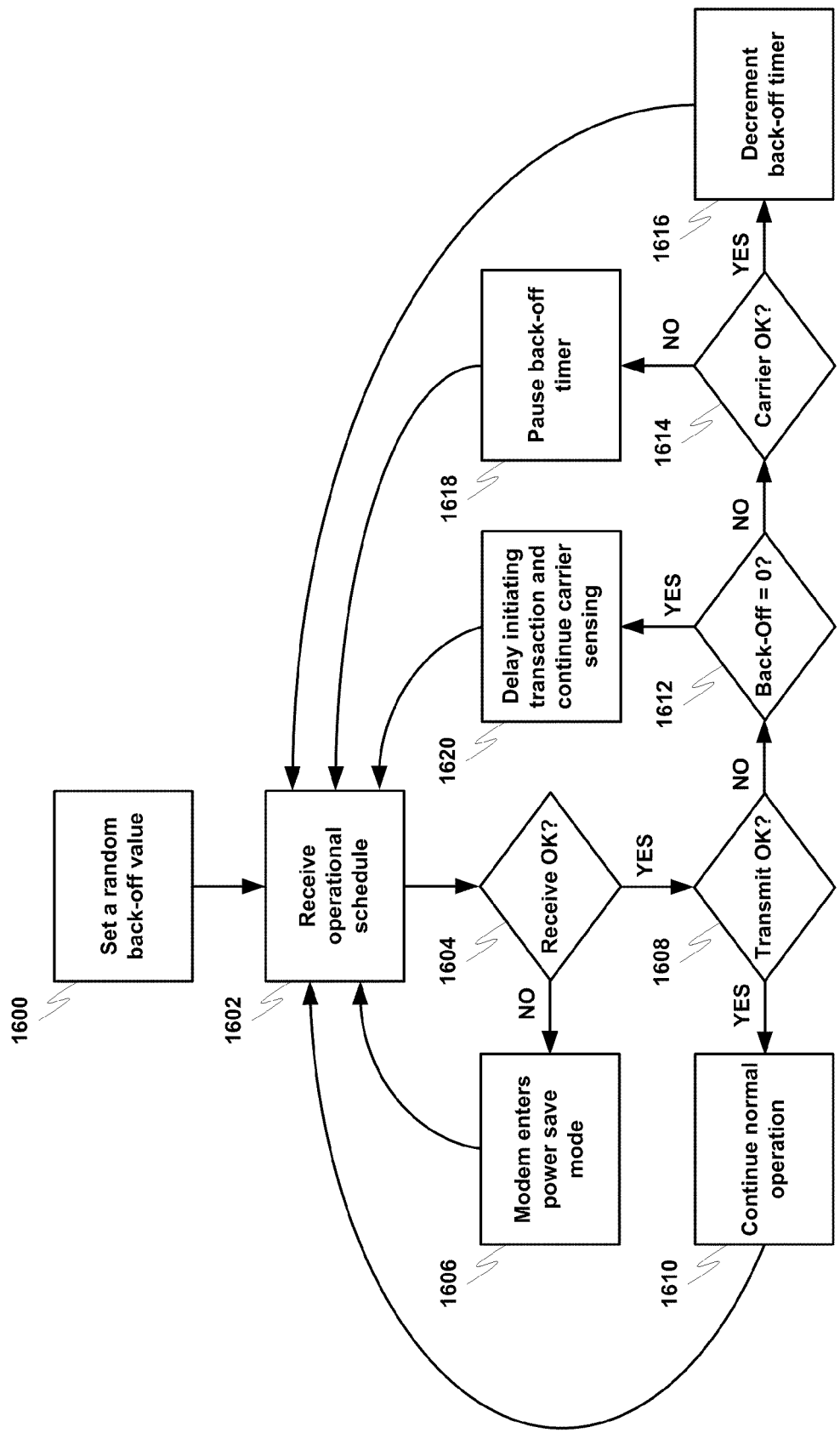
FIG. 16 discloses an exemplary flowchart for implementing a back-off timer with respect to transmit and receive permission in accordance with at least one embodiment of the present invention.

Finer operational schedule control may be available in some embodiments of the present invention. FIG. 16 discloses a process flow wherein a random back-off value may be set (step 1600) and an operational schedule received (step 1602) as in the previous example process. However, the operational schedule in FIG. 16 may include separate periods defining separately when radio module 610 may receive and transmit. For example, if radio module 610 is not allowed to receive incoming messages (step 1604), then in step 1606 radio module 610 may be placed in a power-saving mode until reception is allowed. When reception is allowed per the operational schedule, transmission permission may then be determined in step 1608. If the operational schedule permits transmission, then normal operation in radio module 610 may proceed in step 1610 in accordance with what has been set forth previously in this disclosure.

If transmission is not allowed by the operational schedule, then in step 1612 the current value of the back-off timer may be checked. If the timer has not counted down to zero, then carrier sensing in step 1614 may determine the availability of the channel. If the channel is available, the back-off timer may be decremented in step 1616 and the process may begin again from step 1602. If the channel is not determined to be available, then the back-off counter may be paused in step 1618. Alternatively, if it is determined that the back-off timer has counted down to zero, then in step 1620 the initiation of the message transaction may be delayed while carrier sensing is continued. The process flow may then return to step 1602 in order to recheck the current status of at least the operational schedule and the channel availability.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed:

1. An apparatus, comprising:
    a radio modem configured to communicate on a wireless communication medium via a wireless communication interface;
    a controller coupled to the radio modem, the controller configured to:
    receive scheduling information indicating at least one allowed time period within which the radio modem is allowed to communicate;
        receive information related to at least one message to be sent via the radio modem;
        determine availability of the wireless communication medium;
        when the wireless communication medium is available for the radio modem to communicate, determine whether the time remaining in the allowed time period is sufficient for completing a transaction including transmission of the at least one message; and
        if the time remaining in the allowed time period is sufficient for completing the transaction, initiate the transaction including transmission of the at least one message.

2. The apparatus according to claim 1, wherein the local controller is further configured to receive carrier sensing information from the radio modem.

3. The apparatus according to claim 1, further comprising one or more interfaces coupled to at least the radio modem and the local controller configured to enable communication with other components within the apparatus.

4. The apparatus according to claim 3, wherein the one or more interfaces includes at least one common interface and at least one interface dedicated to delay-sensitive information.

5. The apparatus according to claim 1, wherein controller is configured to determine the availability of the wireless communication medium by initiating carrier sensing via at least one of actual carrier sensing using clear channel assessment (CCA) or virtual carrier sensing using a network allocation vector (NAV).

6. The apparatus according to claim 1, wherein the wireless communication medium is accessible using wireless local area network (WLAN) communication protocol.

7. The apparatus according to claim 1, wherein the controller is configured to delay the transaction until a later time period if the radio modem is not allowed to communicate or the wireless communication medium is not available.

8. The apparatus according to claim 1, wherein the controller is further configured to pause a back-off counter for accessing the wireless communication medium until the radio modem is allowed to communicate and carrier sensing shows that the wireless communication medium is available.

9. The apparatus according to claim 1, wherein the controller is further configured initiate the transaction including transmission of the at least one message if the radio modem is allowed to communicate, the wireless communication medium is available and the back-off counter has finished counting down.

10. The apparatus according to claim 1, further comprising a multiradio controller configured to create the scheduling information indicating at least one allowed time period within which the radio modem is allowed to communicate.

11. The apparatus according to claim 10, wherein the controller is configured to delay the transaction until a later time period and notify the multiradio controller of any time remaining in the allowed time period if the radio modem is not allowed to communicate or the wireless communication medium is not available.

* * * * *